(12) United States Patent
Kitawaki et al.

(10) Patent No.: US 11,208,710 B2
(45) Date of Patent: Dec. 28, 2021

(54) ALUMINUM ALLOY SUBSTRATE FOR MAGNETIC DISKS, METHOD FOR PRODUCING SAME, AND MAGNETIC DISK USING THIS ALUMINUM ALLOY SUBSTRATE FOR MAGNETIC DISKS

(71) Applicants: UACJ CORPORATION, Tokyo (JP); FURUKAWA ELECTRIC CO., LTD., Tokyo (JP)

(72) Inventors: Kotaro Kitawaki, Tokyo (JP); Takuya Murata, Tokyo (JP); Makoto Yonemitsu, Tokyo (JP); Kouichiro Takiguchi, Tokyo (JP); Takashi Nakayama, Tokyo (JP); Kimie Imakawa, Tokyo (JP); Yasuo Fujii, Tokyo (JP); Hideyuki Hatakeyama, Tokyo (JP)

(73) Assignees: UACJ CORPORATION, Tokyo (JP); FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/488,826

(22) PCT Filed: Feb. 9, 2018

(86) PCT No.: PCT/JP2018/004609
§ 371 (c)(1),
(2) Date: Aug. 26, 2019

(87) PCT Pub. No.: WO2018/155237
PCT Pub. Date: Aug. 30, 2018

(65) Prior Publication Data
US 2020/0377984 A1   Dec. 3, 2020

(30) Foreign Application Priority Data
Feb. 27, 2017 (JP) ............................. JP2017-035584

(51) Int. Cl.
*C22F 1/04* (2006.01)
*G11B 5/73* (2006.01)
(Continued)

(52) U.S. Cl.
CPC ............. *C22F 1/04* (2013.01); *C22C 21/00* (2013.01); *G11B 5/73913* (2019.05); *G11B 5/73919* (2019.05); *G11B 5/858* (2013.01)

(58) Field of Classification Search
CPC ....................................................... C22F 1/04
(Continued)

(56) References Cited

U.S. PATENT DOCUMENTS

| 5,762,729 A * | 6/1998 | Nishikawa ............. B41N 1/083 148/551 |
| 2014/0166162 A1* | 6/2014 | Hirayama ............... C22C 21/06 148/551 |

FOREIGN PATENT DOCUMENTS

| JP | H10310836 A | * 11/1998 | ........... B32B 15/016 |
| JP | 2002313061 A | 10/2002 | |

(Continued)

OTHER PUBLICATIONS

Translation WO 2016/068293 (Year: 2016).*
(Continued)

*Primary Examiner* — Coris Fung
*Assistant Examiner* — Danielle M. Carda
(74) *Attorney, Agent, or Firm* — Greer, Burns & Crain, Ltd.

(57) ABSTRACT

Provided are: an aluminum alloy substrate for a magnetic disk, including an aluminum alloy including 0.4 to 3.0 mass % of Fe with the balance of Al and unavoidable impurities; a method for producing the aluminum alloy substrate for a magnetic disk; and a magnetic disk in which an electroless Ni—P plating treatment layer and a magnetic layer formed
(Continued)

thereon are disposed on a surface of the aluminum alloy substrate for a magnetic disk.

17 Claims, 2 Drawing Sheets

(51) Int. Cl.
    *C22C 21/00*     (2006.01)
    *G11B 5/858*     (2006.01)

(58) Field of Classification Search
    USPC .................................................. 148/552
    See application file for complete search history.

(56) References Cited

FOREIGN PATENT DOCUMENTS

| | | |
|---|---|---|
| JP | 2006241513 A | 9/2006 |
| JP | 2008001946 A | 1/2008 |
| JP | 2010168602 A * | 8/2010 |
| JP | 2014196530 A | 10/2014 |
| JP | 2015193901 A | 11/2015 |
| JP | 2017031507 A | 2/2017 |
| JP | 2017186597 A | 10/2017 |
| JP | 2018035428 A | 3/2018 |
| WO | 2016068293 A1 | 5/2016 |

OTHER PUBLICATIONS

Translation WO-2016068293-A1 (Year: 2016).*
Translation JP-2010168602-A (Year: 2010).*
JP-H10310836-A Translation (Year: 1998).*
ISR issued in Int'l, application No. PCT/JP2018/004609, dated Apr. 17, 2018.
Japanese Office Action issued in corresponding JP application No. 2017-035584, dated Aug. 28, 2018 (with translation).
Decision to Grant issued in corresponding JP application No. 2017-035584, dated Oct. 19, 2018 (with translation).

* cited by examiner

ALUMINUM ALLOY SUBSTRATE FOR MAGNETIC DISKS, METHOD FOR PRODUCING SAME, AND MAGNETIC DISK USING THIS ALUMINUM ALLOY SUBSTRATE FOR MAGNETIC DISKS

This is a National Phase Application filed under 35 U.S.C. § 371, of International Application No. PCT/JP2018/004609, filed Feb. 9, 2018, the contents of which are incorporated by reference.

TECHNICAL FIELD

The present disclosure relates to: an aluminum alloy substrate for a magnetic disk, having high strength and a favorable fluttering characteristic; a method for producing the aluminum alloy substrate for a magnetic disk; and a magnetic disk using the aluminum alloy substrate for a magnetic disk.

BACKGROUND ART

Magnetic disks used in storage devices for computers are produced using substrates that have favorable plating properties and are excellent in mechanical characteristics and workability. For example, such a magnetic disk is produced with: a substrate based on an aluminum alloy according to JIS 5086 (including 3.5 to 4.5 mass % of Mg, 0.50 mass % or less of Fe, 0.40 mass % or less of Si, 0.20 to 0.70 mass % of Mn, 0.05 to 0.25 mass % of Cr, 0.10 mass % or less of Cu, 0.15 mass % or less of Ti, and 0.25 mass % or less of Zn with the balance of Al and unavoidable impurities); and the like.

Common magnetic disks are produced by first producing an annular aluminum alloy substrate, plating the aluminum alloy substrate, and then depositing a magnetic substance on a surface of the aluminum alloy substrate.

For example, a magnetic disk made of an aluminum alloy according to the JIS 5086 alloy is produced by the following production steps. First, an aluminum alloy material allowed to contain predetermined chemical components is cast to obtain an ingot, and the ingot is subjected to hot rolling and then to cold rolling to produce a rolled material having a thickness required for the magnetic disk. It is preferable to anneal the rolled material in the cold rolling and/or the like, as needed. Then, the rolled material is stamped to have an annular shape. In order to eliminate distortion and/or the like occurring in the production steps, an aluminum alloy sheet allowed to have an annular shape is layered thereon, and the resultant is subjected to pressurization annealing in which the resultant is flattened by annealing the resultant while pressurizing both surfaces in the upper limit of the resultant. Thus, an annular aluminum alloy substrate is produced.

The annular aluminum alloy substrate produced in such a manner is subjected to cutting work, grinding work, degreasing, etching, and zincate treatment (Zn substitution treatment) as pretreatment and then to electroless plating with Ni—P which is a rigid non-magnetic metal as undercoat treatment. The plated surface is subjected to polishing, followed by sputtering a magnetic substance on the Ni—P electroless-plated surface, to produce the magnetic disk made of an aluminum alloy.

In recent years, larger-capacity, higher-density, and, in addition, higher-speed magnetic disks have been demanded due to the needs of multimedia and the like. The higher capacity has resulted in an increase in the number of magnetic disks placed in a storage device. Thus, thinned magnetic disks have also been demanded. However, since strength has been decreased by thinning an aluminum alloy substrate for a magnetic disk, the higher strength of the aluminum alloy substrate has been demanded.

In addition, thinning and enhanced speed result in an increase in exciting force caused by a decrease in rigidity and an increase in fluid force due to high-speed rotation, thereby causing disk flutter to be more likely to occur. This is because high-speed rotation of magnetic disks causes unstable airflow to be generated between the disks, and the airflow results in vibration (fluttering) of the magnetic disks. Such a phenomenon is considered to occur because the low rigidity of a substrate results in the increased vibration of the magnetic disks, and a head is incapable of following such a variation. The occurrence of fluttering results in an increase in the positioning error of a head which is a reader. Therefore, reduction in disk flutter has been earnestly demanded.

In addition, the higher density of a magnetic disk results in a finer magnetic region per bit. Such a finer magnetic region causes a reading error to be more likely to occur due to the deviation of the positioning error of the head. Thus, a reduction in disk flutter which is the principal factor of the positioning error of the head has been earnestly demanded.

In light of such actual circumstances, aluminum alloy substrates for magnetic disks with high strength and reduced disk flutter have been earnestly desired and examined in recent years. For example, it has been proposed that an airflow suppression component including a plate facing a disk is implemented in a hard disk drive. Patent Literature 1 proposes a magnetic disk apparatus in which an air spoiler is placed upstream of an actuator. The air spoiler weakens air flow toward the actuator on the magnetic disk to reduce the windage vibration of a magnetic head. In addition, the air spoiler weakens airflow on the magnetic disk, thereby suppressing disk flutter. In addition, Patent Literature 2 proposes a method in which a large amount of Mg contributing to improvement in the strength of an aluminum alloy sheet is allowed to be contained to improve the strength.

In the method disclosed in Patent Literature 1, however, a fluttering suppression effect is varied according to a variation in the spacing between the placed air spoiler and a substrate for a magnetic disk, the high precision of components is required, and therefore, an increase in component cost is caused.

The method in which a large amount of Mg is allowed to be contained, described in Patent Literature 2, is effective for improving strength. In the method, however, disk flutter has been prone to occur, and it has been impossible to obtain an objective characteristic of low disk flutter under present circumstances.

CITATION LIST

Patent Literature

PTL 1: Unexamined Japanese Patent Application Kokai Publication No. 2002-313061
PTL 2: Unexamined Japanese Patent Application Kokai Publication No. 2006-241513

SUMMARY OF INVENTION

Technical Problem

The present disclosure was made under such actual circumstances with an objective to provide an aluminum alloy substrate for a magnetic disk, having high strength and an excellent disk fluttering characteristic, a method for producing the aluminum alloy substrate for a magnetic disk, and a magnetic disk using the aluminum alloy substrate for a magnetic disk.

Solution to Problem

In other words, claim 1 of the present disclosure describes an aluminum alloy substrate for a magnetic disk, including an aluminum alloy including 0.4 to 3.0 mass % of Fe with a balance of Al and unavoidable impurities.

Claim 2 of the present disclosure describes that the aluminum alloy further includes one or two or more selected from a group consisting of 0.1 to 3.0 mass % of Mn, 0.1 to 0.4 mass % of Si, 0.1 to 3.0 mass % of Ni, 0.005 to 1.000 mass % of Cu, 0.1 to 6.0 mass % of Mg, 0.01 to 1.00 mass % of Cr, and 0.01 to 1.00 mass % of Zr, in accordance with claim 1.

Claim 3 of the present disclosure describes that the aluminum alloy further includes 0.005 to 1.000 mass % of Zn, in accordance with claim 1 or 2.

Claim 4 of the present disclosure describes that one or two or more selected from a group consisting of Ti, B, and V of which a total of contents is 0.005 to 0.500 mass % is further included, in accordance with any one of claims 1 to 3.

Claim 5 of the present disclosure describes that a boundary length of a second phase particle having a longest diameter of 3 μm or more is 10 mm/mm² or more in a metal structure, in accordance with any one of claims 1 to 4.

Claim 6 of the present disclosure describes that an amount of solid solution of Fe is 0.0010 mass % or more, in accordance with any one of claims 1 to 5.

Claim 7 of the present disclosure describes that proof stress is 35 MPa or more after heating at 300° C. for 3 hours in atmospheric air, in accordance with any one of claims 1 to 6.

Claim 8 of the present disclosure describes that both surfaces are clad with a sheath material including pure Al or an Al—Mg-based alloy, in accordance with any one of claims 1 to 7.

Claim 9 of the present disclosure describes a magnetic disk wherein an electroless Ni—P plating treatment layer and a magnetic layer formed thereon are disposed on a surface of the aluminum alloy substrate according to any one of claims 1 to 8.

Claim 10 of the present disclosure describes a method for producing the aluminum alloy substrate according to any one of claims 1 to 7, the method for producing the aluminum alloy substrate for a magnetic disk, including: a casting step of casting an ingot using an aluminum alloy; a hot-rolling step of hot-rolling the ingot; a cold-rolling step of cold-rolling the hot-rolled sheet; a disk blank stamping step of stamping the cold-rolled sheet to have an annular shape; a pressurization annealing step of subjecting the stamped disk blank to pressurization annealing; and a cutting/grinding step of performing cutting work and grinding work of the blank subjected to the pressurization annealing.

Claim 11 of the present disclosure describes that a homogenization heat treatment step of performing homogenization heat treatment of the ingot is further included between the casting step and the hot-rolling step, in accordance with claim 10.

Claim 12 of the present disclosure describes that an annealing treatment step of annealing the rolled sheet is further included before or in the cold rolling, in accordance with claim 10 or 11.

Claim 13 of the present disclosure describes a method for producing the aluminum alloy substrate according to claim 8, the method for producing the aluminum alloy substrate for a magnetic disk, including: a core material casting step of casting an ingot for a core material using an aluminum alloy; a sheath material casting step of casting an ingot for a sheath material using pure Al or an Al—Mg-based alloy; a sheath material step of performing homogenization treatment of the ingot for a sheath material and then hot-rolling the ingot to make a sheath material; a joined material step of joining the sheath material to each of both surfaces of the ingot for a core material to make a joined material; a hot-rolling step of hot-rolling the joined material; a cold-rolling step of cold-rolling the hot-rolled sheet; a disk blank stamping step of stamping the cold-rolled sheet to have an annular shape; a pressurization annealing step of subjecting the stamped disk blank to pressurization annealing; and a cutting/grinding step of performing cutting work and grinding work of the blank subjected to the pressurization annealing.

Claim 14 of the present disclosure describes that a homogenization heat treatment step of performing homogenization heat treatment of the joined material is further included between the joined material step and the hot-rolling step, in accordance with claim 13.

Claim 15 of the present disclosure describes that an annealing treatment step of annealing the rolled sheet is further included before or in the cold rolling, in accordance with claim 13 or 14.

Advantageous Effects of Invention

In accordance with the present disclosure, there can be provided an aluminum alloy substrate for a magnetic disk, having high strength and an excellent disk fluttering characteristic, a method for producing the aluminum alloy substrate for a magnetic disk, and a magnetic disk using the aluminum alloy substrate for a magnetic disk.

DESCRIPTION OF EMBODIMENTS

Figure 1:
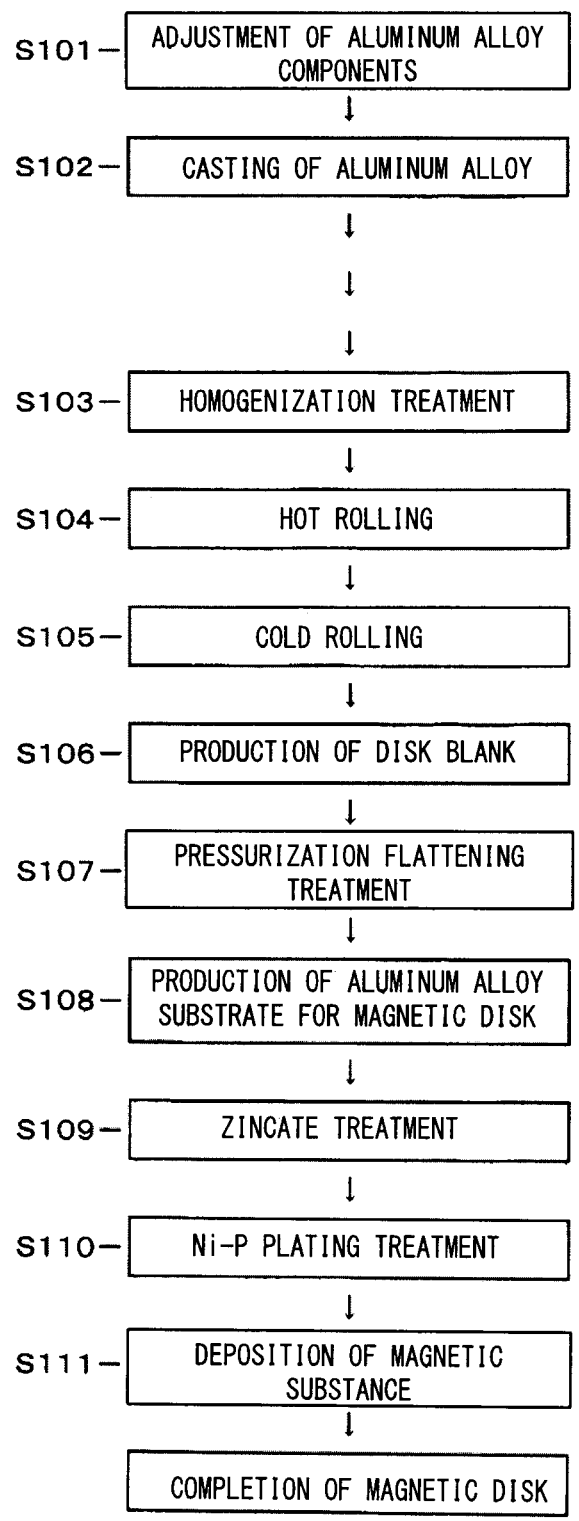
FIG. 1 is a flow diagram illustrating a method for producing an aluminum alloy substrate for a magnetic disk using a bare material according to the present disclosure.

The present inventors focused on the relationships between the strength and fluttering characteristic of a substrate and the material of the substrate and intensively researched the relationships between such characteristics and the characteristics of the substrate (magnetic disk material). As a result, the content of Fe and the amount of solid solution of Fe were found to greatly influence the strength. In addition, the content of Fe in an aluminum alloy substrate and the boundary length of second phase particles in a metal structure were found to greatly influence the fluttering characteristic of a magnetic disk, measured in air or helium. As a result, the present inventors found that improvement in strength and fluttering characteristic is achieved in an aluminum alloy substrate for a magnetic disk in which the content of Fe is in a range of 0.4 to 3.0 mass % (hereinafter abbreviated as "%"). The present inventors thus accomplished the present disclosure on the basis of such findings.

The aluminum alloy substrate according to the present disclosure will be described in detail below.

The aluminum alloy substrate for a magnetic disk is used as a single-layered bare material or a three-layer clad material. The clad material is an alloy sheet in which two or more different alloy sheets are metallurgically joined. Herein, the intermediate material of the three-layer clad material is regarded as a core material, and materials on both surfaces of the core material are regarded as sheath materials. In addition, the aluminum alloy substrate in the present disclosure is intended to include both the bare material and the clad material unless otherwise specified.

1. Alloy Composition

Aluminum alloy components in the bare material and the core material of the clad material, included in the Al—Fe-based aluminum alloy substrate for a magnetic disk according to the present disclosure, as well as the contents of the aluminum alloy components will be described below.

Fe:

Fe is an essential element, exists principally as second phase particles (Al—Fe-based intermetallic compound or the like), exists to be partly solid-dissolved in a matrix, and exhibits the effect of improving the strength and fluttering characteristic of the aluminum alloy substrate. Application of vibrations to such a material results in immediate absorption of vibrational energy due to viscous flow in the interface between the second phase particles and the matrix to obtain a very favorable fluttering characteristic. It is impossible to obtain a sufficient strength and a sufficient fluttering characteristic when the content of Fe in an aluminum alloy is less than 0.4%. In contrast, an Fe content of more than 3.0% results in generation of a large number of coarse Al—Fe-based intermetallic compound particles. In the bare material, such coarse Al—Fe-based intermetallic compound particles fall off, thereby generating large recesses, in etching, zincate treatment, cutting work, and grinding work, and causing the deterioration of the smoothness of a plated surface and the peeling of plating to occur. In the case of the core material of the clad material, coarse Al—Fe-based intermetallic compound particles on a side of the substrate fall off in etching, zincate treatment, and cutting work, thereby generating large recesses, and causing peeling of plating to occur in the boundary between the core material and the sheath material on the side of the substrate. In addition, workability is also deteriorated in a rolling step. Therefore, the content of Fe in the aluminum alloy is set in a range of 0.4 to 3.0%. The content of Fe is preferably in a range of 0.6 to 2.0% and more preferably in a range of 0.8 to 1.8%.

One or two or more selected from the group consisting of 0.1 to 3.0% of Mn, 0.1 to 0.4% of Si, 0.1 to 3.0% of Ni, 0.005 to 1.000% of Cu, 0.1 to 6.0% of Mg, 0.01 to 1.00% of Cr, and 0.01 to 1.00% of Zr may be further included as first selective elements in order to further improve the strength and fluttering characteristic of the aluminum alloy substrate for a magnetic disk. In addition, 0.005 to 1.000% of Zn may be further contained as a second selective element. Furthermore, one or two or more selected from the group consisting of Ti, B, and V in a total content of 0.005 to 0.500% may be further contained as third selective elements. The selective elements will be described below.

Mn:

Mn exists principally as second phase particles (Al—Mn-based intermetallic compound or the like) and exhibits the effect of improving the strength and fluttering characteristic of the aluminum alloy substrate. Application of vibrations to such a material results in immediate absorption of vibrational energy due to viscous flow in the interface between the second phase particles and the matrix to obtain a very favorable fluttering characteristic. The effect of improving the strength and fluttering characteristic of the aluminum alloy substrate can be further enhanced by allowing the content of Mn in the aluminum alloy to be 0.1% or more. In addition, generation of a large number of coarse Al—Mn-based intermetallic compound particles is inhibited by allowing the content of Mn in the aluminum alloy to be 3.0% or less. In the bare material, such coarse Al—Mn-based intermetallic compound particles can be inhibited from falling off, thereby generating large recesses, in etching, zincate treatment, cutting work, and grinding work, and the deterioration of the smoothness of the plated surface and the peeling of the plating can be further inhibited from occurring. In the case of the core material of the clad material, the falling-off of the coarse Al—Mn-based intermetallic compound particles on a side of the substrate and the generation of large recesses in etching, zincate treatment, and cutting work can be suppressed, and the peeling of plating in the boundary between the core material and the sheath material on the side of the substrate can be further suppressed. In addition, the deterioration of the workability in the rolling step can be further inhibited. Therefore, the content of Mn in the aluminum alloy is preferably set in a range of 0.1 to 3.0%, and more preferably set in a range of 0.1 to 1.0%.

Si:

Si exists principally as second phase particles (Si particles or the like) and exhibits the effect of improving the strength and fluttering characteristic of the aluminum alloy substrate. Application of vibrations to such a material results in immediate absorption of vibrational energy due to viscous flow in the interface between the second phase particles and the matrix to obtain a very favorable fluttering characteristic. The effect of improving the strength and fluttering characteristic of the aluminum alloy substrate can be further enhanced by allowing the content of Si in the aluminum alloy to be 0.1% or more. In addition, generation of a large number of coarse Si particles is inhibited by allowing the content of Si in the aluminum alloy to be 0.4% or less. In the bare material, such coarse Si particles can be inhibited from falling off, thereby generating large recesses, in etching, zincate treatment, cutting work, and grinding work, and the deterioration of the smoothness of the plated surface and the peeling of the plating can be further inhibited from occurring. In the case of the core material of the clad material, the falling-off of the coarse Si particles on a side of the substrate and the generation of large recesses in etching, zincate treatment, and cutting work can be suppressed, and the peeling of plating in the boundary between the core material and the sheath material on the side of the substrate can be further suppressed. In addition, the deterioration of the workability in the rolling step can be further inhibited. Therefore, the content of Si in the aluminum alloy is preferably set in a range of 0.1 to 0.4%, and more preferably set in a range of 0.1 to 0.3%.

Ni:

Ni exists principally as second phase particles (Al—Ni-based intermetallic compound or the like) and exhibits the effect of improving the strength and fluttering characteristic of the aluminum alloy substrate. Application of vibrations to such a material results in immediate absorption of vibrational energy due to viscous flow in the interface between the second phase particles and the matrix to obtain a very favorable fluttering characteristic. The effect of improving the strength and fluttering characteristic of the aluminum alloy substrate can be further enhanced by allowing the content of Ni in the aluminum alloy to be 0.1% or more. In addition, generation of a large number of coarse Al—Ni-based intermetallic compound particles is inhibited by allowing the content of Ni in the aluminum alloy to be 3.0% or less. In the bare material, such coarse Al—Ni-based intermetallic compound particles can be inhibited from falling off, thereby generating large recesses, in etching, zincate treatment, cutting work, and grinding work, and the deterioration of the smoothness of the plated surface and the peeling of the plating can be further inhibited from occurring. In the case of the core material of the clad material, the falling-off of the coarse Al—Ni-based intermetallic compound particles on a side of the substrate and the generation of large recesses in etching, zincate treatment, and cutting work can be suppressed, and the peeling of plating in the boundary between the core material and the sheath material on the side of the substrate can be further suppressed. In addition, the deterioration of the workability in the rolling step can be further inhibited. Therefore, the content of Ni in the aluminum alloy is preferably set in a range of 0.1 to 3.0%, and more preferably set in a range of 0.1 to 1.0%.

Cu:

Cu exists principally as second phase particles (Al—Cu-based intermetallic compound or the like) and exhibits the effect of improving the strength and fluttering characteristic of the aluminum alloy substrate. In addition, the amount of Al dissolved in zincate treatment is decreased. Furthermore, the effect of uniformly, thinly, and minutely depositing a zincate coating film to improve smoothness in a subsequent plating step is exhibited. The effect of improving the strength and fluttering characteristic of the aluminum alloy substrate and the effect of improving smoothness can be further enhanced by allowing the content of Cu in the aluminum alloy to be 0.005% or more. In addition, generation of a large number of coarse Al—Cu-based intermetallic compound particles is inhibited by allowing the content of Cu in the aluminum alloy to be 1.000% or less. In the bare material, such coarse Al—Cu-based intermetallic compound particles can be inhibited from falling off, thereby generating large recesses, in etching, zincate treatment, cutting work, and grinding work, to further enhance the effect of improving the smoothness of the plated surface, and the peeling of the plating can be further inhibited from occurring. In the case of the core material of the clad material, the falling-off of the coarse Al—Cu-based intermetallic compound particles on a side of the substrate and the generation of large recesses in etching, zincate treatment, and cutting work can be suppressed, and the peeling of plating in the boundary between the core material and the sheath material on the side of the substrate can be further suppressed. In addition, the deterioration of the workability in the rolling step can be further inhibited. Therefore, the content of Cu in the aluminum alloy is preferably set in a range of 0.005 to 1.000%, and more preferably set in a range of 0.005 to 0.400%.

Mg:

Mg exists principally as second phase particles (Mg—Si-based intermetallic compound or the like) and exhibits the effect of improving the strength and fluttering characteristic of the aluminum alloy substrate. The effect of improving the strength and fluttering characteristic of the aluminum alloy substrate can be further enhanced by allowing the content of Mg in the aluminum alloy to be 0.1% or more. In addition, generation of a large number of coarse Mg—Si-based intermetallic compound particles is inhibited by allowing the content of Mg in the aluminum alloy to be 6.0% or less. In the bare material, such coarse Mg—Si-based intermetallic compound particles can be inhibited from falling off, thereby generating large recesses, in etching, zincate treatment, cutting work, and grinding work, and the deterioration of the smoothness of the plated surface and the peeling of the plating can be further inhibited from occurring. In the case of the core material of the clad material, the falling-off of the coarse Mg—Si-based intermetallic compound particles on a side of the substrate and the generation of large recesses in etching, zincate treatment, and cutting work can be suppressed, and the peeling of plating in the boundary between the core material and the sheath material on the side of the substrate can be further suppressed. In addition, the deterioration of the workability in the rolling step can be further inhibited. Therefore, the content of Mg in the aluminum alloy is preferably set in a range of 0.1 to 6.0%, and more preferably set in a range of 0.3% or more and less than 1.0%.

Cr:

Cr exists principally as second phase particles (Al—Cr-based intermetallic compound or the like) and exhibits the effect of improving the strength and fluttering characteristic of the aluminum alloy substrate. The effect of improving the strength and fluttering characteristic of the aluminum alloy substrate can be further enhanced by allowing the content of Cr in the aluminum alloy to be 0.01% or more. In addition, generation of a large number of coarse Al—Cr-based intermetallic compound particles is inhibited by allowing the content of Cr in the aluminum alloy to be 1.00% or less. In the bare material, such coarse Al—Cr-based intermetallic compound particles can be inhibited from falling off, thereby generating large recesses, in etching, zincate treatment, cutting work, and grinding work, and the deterioration of the smoothness of the plated surface and the peeling of the plating can be further inhibited from occurring. In the case of the core material of the clad material, the falling-off of the coarse Al—Cr-based intermetallic compound particles on a side of the substrate and the generation of large recesses in etching, zincate treatment, and cutting work can be suppressed, and the peeling of plating in the boundary between the core material and the sheath material on the side of the substrate can be further suppressed. In addition, the deterioration of the workability in the rolling step can be further inhibited. Therefore, the content of Cr in the aluminum alloy is preferably set in a range of 0.01 to 1.00%, and more preferably set in a range of 0.1 to 0.5%.

Zr:

Zr exists principally as second phase particles (Al—Zr-based intermetallic compound or the like) and exhibits the effect of improving the strength and fluttering characteristic of the aluminum alloy substrate. The effect of improving the strength and fluttering characteristic of the aluminum alloy substrate can be further enhanced by allowing the content of Zr in the aluminum alloy to be 0.01% or more. In addition, generation of a large number of coarse Al—Zr-based intermetallic compound particles is inhibited by allowing the content of Zr in the aluminum alloy to be 1.00% or less. In the bare material, such coarse Al—Zr-based intermetallic compound particles can be inhibited from falling off, thereby generating large recesses, in etching, zincate treatment, cutting work, and grinding work, and the deterioration of the smoothness of the plated surface and the peeling of the plating can be further inhibited from occurring. In the case of the core material of the clad material, the falling-off of the coarse Al—Zr-based intermetallic compound particles on a side of the substrate and the generation of large recesses in etching, zincate treatment, and cutting work can be suppressed, and the peeling of plating in the boundary between the core material and the sheath material on the side of the substrate can be further suppressed. In addition, the dete-rioration of the workability in the rolling step can be further inhibited. Therefore, the content of Zr in the aluminum alloy is preferably set in a range of 0.01 to 1.00%, and more preferably set in a range of 0.1 to 0.5%.

Zn:

Zn exhibits the effects of decreasing the amount of Al melted in zincate treatment and of uniformly, thinly, and minutely depositing a zincate coating film to improve smoothness and adhesiveness in the subsequent plating step. In addition, Zn forms second phase particles together with other added elements and exhibits the effect of improving the fluttering characteristic. The effects of decreasing the amount of Al melted in the zincate treatment and of uniformly, thinly, and minutely depositing the zincate coating film to improve the smoothness of the plating can be further enhanced by allowing the content of Zn in the aluminum alloy to be 0.005% or more. In the bare material, the zincate coating film becomes uniform to enable the smoothness of the plated surface to be further inhibited from deteriorating, and the plating can be further inhibited from peeling, by allowing the content of Zn in the aluminum alloy to be 1.000% or less. In the case of the clad material, a zincate coating film on a side of the substrate can be allowed to be uniform to suppress the deterioration of the adhesiveness of plating, and the peeling of plating in the boundary between the core material and the sheath material on the side of the substrate can be still more suppressed. In addition, the deterioration of the workability in the rolling step can be further inhibited. Therefore, the content of Zn in the aluminum alloy is preferably set in a range of 0.005 to 1.000%, and more preferably set in a range of 0.100 to 0.700%.

Ti, B, V:

Ti, B, and V form second phase particles (such as borides such as $TiB_2$, and $Al_3Ti$ and Ti-V-B particles), which become crystal grain nuclei, in a solidification process in casting, and therefore enable crystal grains to be finer. As a result, plating properties are improved. In addition, the effect of reducing nonuniformity in the sizes of the second phase particles to reduce unevenness in strength and fluttering characteristic in the aluminum alloy substrate is exhibited by allowing the crystal grains to be finer. However, it is impossible to obtain the above-described effects when the total of the contents of Ti, B, and V is less than 0.005%. In contrast, even when the total of the contents of Ti, B, and V is more than 0.500%, the effects are saturated, and it is impossible to obtain further noticeable improvement effects. Therefore, the total of the contents of Ti, B, and V in the case of adding Ti, B, and V is preferably set in a range of 0.005 to 0.500%, and more preferably set in a range of 0.005 to 0.100%. When only any one of Ti, B, and V is contained, the total refers to the content of the one; when any two thereof are contained, the total refers to the total of the two; and when all the three thereof are contained, the total refers to the total of the three.

Other Elements:

In addition, the balance of the aluminum alloy used in the present disclosure consists of Al and unavoidable impurities. In such a case, examples of the unavoidable impurities include Ga and Sn, and the characteristics of the aluminum alloy substrate obtained in the present disclosure are not deteriorated when each and the total of the unavoidable impurities are less than 0.1% and less than 0.2%, respectively.

2. Distribution State and Boundary Length of Second Phase Particles

The distribution state of the second phase particles in the core material of the clad material and the bare material in the aluminum alloy substrate according to the present disclosure will now be described.

In the metal structure of the aluminum alloy substrate according to the present disclosure, the presence density of second phase particles having a longest diameter of 3 μm or more is preferably 100 to 50000 particles/mm$^2$, and more preferably 1000 to 50000 particles/mm$^2$.

In such a case, the second phase particles mean precipitates or crystallized products, and specifically refer to, for example, particles such as Al—Fe-based intermetallic compounds ($Al_3Fe$, $Al_6Fe$, $Al_6$(Fe, Mn), Al—Fe—Si, Al—Fe—Mn—Si, Al—Fe—Ni, Al—Cu—Fe, and the like), Al—Mn-based intermetallic compounds ($Al_6Mn$ and Al—Mn—Si), Si particles, Al—Ni-based intermetallic compounds ($Al_3Ni$ and the like), Al—Cu-based intermetallic compounds ($Al_2Cu$ and the like), Mg—Si-based intermetallic compounds ($Mg_2Si$ and the like), Al—Cr-based intermetallic compounds ($Al_7Cr$ and the like), and Al—Zr-based intermetallic compounds ($Al_3Zr$ and the like).

In the metal structure of the aluminum alloy substrate according to the present disclosure, the boundary length of the second phase particles having a longest diameter of 3 μm or more is preferably 10 mm/mm$^2$ or more. A case in which the boundary length is 10 mm/mm$^2$ or more results in improvement in the fluttering characteristic of the aluminum alloy substrate, that is, the effect of further reducing the maximum displacement of fluttering. The improvement in the fluttering characteristic is considered to result from the increased surface area of the second phase particles. This is considered to be because vibrations generated by airflow are absorbed and attenuated by the interface between the aluminum alloy matrix and the second phase particles in the process of propagating through the disk. In addition, the maximum displacement of the fluttering is considered to be proportional to the surface area of the second phase particles dispersed in the aluminum alloy matrix, and is considered to be proportional to the square of the boundary length of the second phase particles.

When the longest diameter of the second phase particles existing in the metal structure of the aluminum alloy substrate is less than 3 μm, vibrational energy absorbed by the interface between the aluminum alloy matrix and the second phase particles is small, and therefore, the effect of improving the fluttering characteristic becomes small. Therefore, the longest diameter of the second phase particles existing in the metal structure of the aluminum alloy substrate is preferably in a range of 3 μm or more. In addition, the longest diameter of the second phase particles is more preferably in a range of 5 μm or more in view of the balance with the fluttering characteristic. The upper limit of the longest diameter is not particularly limited. However, workability in the rolling step is gradually deteriorated with increasing the longest diameter of the second phase particles, and a longest diameter of more than 100 μm may preclude rolling, thereby precluding the production of the aluminum alloy substrate. Therefore, the upper limit of the longest diameter of the second phase particles is preferably 100 μm.

When the boundary length of the second phase particles having a longest diameter of 3 μm or more, existing in the metal structure of the aluminum alloy substrate, is less than 10 mm/mm$^2$, vibrational energy absorbed by the interface between the aluminum alloy matrix and the second phase particles is small, and therefore, the effect of improving the fluttering characteristic becomes small. Therefore, the boundary length of the second phase particles existing in the metal structure of the aluminum alloy substrate is preferably in a range of 10 mm/mm$^2$ or more. In addition, the boundary length of the second phase particles is more preferably in a range of 20 mm/mm² or more, and still more preferably in a range of 30 mm/mm² or more, in view of the balance with the fluttering characteristic. The upper limit of the boundary length is not particularly limited. However, workability in the rolling step is gradually deteriorated with increasing the boundary length of the second phase particles, and a boundary length of more than 800 mm/mm² may preclude rolling, thereby precluding production of an aluminum alloy sheet. Therefore, the upper limit of the boundary length of the second phase particles is preferably 800 mm/mm². In the case of the bare material, the second phase particles can be inhibited from falling off, thereby generating large recesses, in etching, zincate treatment, cutting work, and grinding work, and the deterioration of the smoothness of the plated surface and the peeling of the plating can be further inhibited from occurring, by allowing the boundary length of the second phase particles having a longest diameter of 3 μm or more to be in a range of 10 mm/mm² or more in such a manner. In addition, in the case of the core material of the clad material, the falling-off of the second phase particles on a side of the substrate and the generation of large recesses in etching, zincate treatment, and cutting work can be suppressed, and the peeling of plating in the boundary between the core material and the sheath material on the side of the substrate can be further suppressed.

In a planar image of second phase particles observed with an optical microscope, first, a maximum value of the distance between one point on a contour and another point on the contour is measured, such maximum values with regard to all the points on the contour are then measured, and the highest value is finally selected from all the maximum values; and the longest diameter refers to the highest value in the present disclosure. Moreover, the boundary length indicates the length of the outer periphery of the image of a second phase particle, photographed with an optical microscope.

3. Fluttering Characteristic

Fluttering characteristics are also influenced by the motor characteristics of a hard disk drive. In the present disclosure, the fluttering characteristic is preferably 50 nm or less, and more preferably 30 nm or less, in air. A fluttering characteristic of 50 nm or less is considered to be acceptable for use for common HDDs. A fluttering characteristic of more than 50 nm results in an increase in the positioning error of a head which is a reader.

In addition, the fluttering characteristic is preferably 30 nm or less, and more preferably 20 nm or less, in helium. A fluttering characteristic of 30 nm or less was considered to be acceptable for use for HDDs having higher-density recording capacities. A fluttering characteristic of more than 30 nm results in an increase in the positioning error of the head which is the reader.

A required fluttering characteristic varies according to a hard disk drive used, and therefore, the distribution state of the second phase particles may be determined as appropriate on the basis of the fluttering characteristic. Such fluttering characteristics can be obtained by appropriately adjusting each of the contents of added elements described below, a casting method including a cooling rate in casting, and a heat history and a working history in subsequent heat treatment and working.

In an embodiment of the present disclosure, the thickness of the aluminum alloy sheet is preferably 0.45 mm or more. When the thickness of the aluminum alloy sheet is less than 0.45 mm, the substrate may be deformed by accelerating force caused by, for example, drop occurring in, for example, installation of a hard disk drive, except in a case in which the deformation can be inhibited by further increasing proof stress. A case in which the thickness of the aluminum alloy sheet is more than 1.30 mm is not preferred because of resulting in a decrease in the number of disks that can be mounted in a hard disk although resulting in improvement in fluttering characteristic. Accordingly, the thickness of the aluminum alloy sheet is more preferably set at 0.45 to 1.30 mm, and still more preferably set at 0.50 to 1.00 mm.

Fluid force can be decreased by filling helium into a hard disk. This is because the density of helium gas is as low as about ⅛ of the density of air. Fluttering generated by gas flow associated with the rotation of the hard disk is reduced by decreasing the fluid force of the gas.

4. Amount of Solid Solution of Fe

The amount of the solid solution of Fe in the core material of the clad material and the bare material in the aluminum alloy substrate according to the present disclosure will now be described.

The amount of the solid solution of Fe in the aluminum alloy substrate according to the present disclosure is preferably 0.0010% or more. In such a case, the effect of still more improving the strength of the aluminum alloy substrate by solid-solution strengthening is exhibited. When the proof stress of the aluminum alloy substrate is low, the aluminum alloy substrate may be deformed due to application of external force in, for example, the conveyance or installation of the aluminum alloy substrate. Therefore, the amount of the solid solution of Fe in the aluminum alloy substrate is preferably set at 0.0010% or more, and more preferably set at 0.0030% or more. The upper limit of the amount of the solid solution of Fe is not particularly limited. However, the larger amount of the solid solution of Fe may result in the deterioration of a fluttering characteristic. Therefore, the upper limit of the amount of the solid solution of Fe is preferably around 0.04%.

5. Proof Stress

The proof stress of the aluminum alloy substrate according to the present disclosure will now be described.

The aluminum alloy substrate according to the present disclosure, heated at 300° C. for 3 hours in atmospheric air, preferably has a proof stress of 35 MPa or more. In such a case, the effect of still more inhibition of the deformation of the substrate in production of a magnetic disk is exhibited. When the proof stress of the aluminum alloy substrate is low, the aluminum alloy substrate may be deformed due to application of external force in, for example, the conveyance or installation of the aluminum alloy substrate. Therefore, the proof stress of the aluminum alloy substrate heated at 300° C. for 3 hours in atmospheric air is preferably 35 MPa or more, and more preferably 45 MPa or more. Since heat treatment is performed at a maximum of around 300° C. in steps from the production of the substrate for a magnetic disk (step S108 in FIG. 1 or step S208 in FIG. 2) to the deposition of the magnetic substance (step S111 in FIG. 1 or step S211 in FIG. 2), the proof stress is defined in the case of the heating at 300° C. The upper limit of the proof stress is not particularly limited but is logically determined depending on the composition of the alloy and on production conditions, and is around 180 MPa in the present disclosure.

6. Composition of Sheath Material

The alloy compositions of the sheath material of the clad material included in the aluminum alloy substrate according to the present disclosure and the contents of the alloy compositions will now be described.

In the aluminum alloy substrate according to the present disclosure, the excellent smoothness of the plated surface can be obtained even in the case of only the bare material.

However, the plated surface can be allowed to be smoother by disposing the sheath materials containing a small number of second phase particles on both surfaces of the core material to make the clad material.

In the aluminum alloy substrate according to the present disclosure, pure Al or an Al—Mg-based alloy is preferably used as the sheath material. Pure Al and the Al—Mg-based alloy contain a small number of relatively coarse second phase particles and are excellent in plating properties in comparison with other alloys.

The sheath material with pure Al used in the aluminum alloy substrate according to the present disclosure preferably contains 0.005 to 0.600% of Cu, 0.005 to 0.600% of Zn, 0.001 to 0.300% of Si, 0.001 to 0.300% of Fe, 0.001 to 1.000% of Mg, 0.300% or less of Cr, and 0.300% or less of Mn, and the balance of Al and unavoidable impurities. Examples thereof include Al according to JIS A 1000 series.

It is preferable that the sheath material of the Al—Mg-based alloy used in the aluminum alloy substrate according to the present disclosure contains 1.0 to 8.0% of Mg, further contains one or two or more selected from the group consisting of 0.005 to 0.600% of Cu, 0.005 to 0.600% of Zn, 0.010 to 0.300% of Cr, 0.001 to 0.300% of Si, 0.001 to 0.300% of Fe, and 0.300% or less of Mn, and includes the balance of Al and unavoidable impurities.

7. Method for Producing Aluminum Alloy Substrate for Magnetic Disk

Each step and process conditions of steps for producing the aluminum alloy substrate according to the present disclosure will be described in detail below.

A method for producing a magnetic disk using a bare material as an aluminum alloy substrate is described with reference to a flow in FIG. 1. In such a case, preparation of aluminum alloy components (step S101) to cold rolling (step S105) are steps for producing an aluminum alloy sheet, and production of a disk blank (step S106) to deposition of a magnetic substance (step S111) are steps for making the produced aluminum alloy sheet into a magnetic disk. First, the steps for producing the aluminum alloy substrate for a magnetic disk, which is the bare material, are described.

First, a molten metal of an aluminum alloy material having the component composition described above is prepared by heating and melting according to a usual method (step S101). Then, an aluminum alloy is cast from the prepared molten metal of the aluminum alloy material by a semi-continuous casting (DC casting) method, a continuous casting (CC casting) method, or the like (step S102). In such a case, the DC casting method and the CC casting method are as follows.

In the DC casting method, the heat of the molten metal poured through a spout is removed by a bottom block, the wall of a water-cooled mold, and cooling water directly discharged to the outer periphery of an ingot, and the molten metal is solidified and drawn downward as the ingot.

In the CC casting method, the molten metal is supplied into between a pair of rolls (or a belt caster and a block caster) through a casting nozzle, and a thin sheet is directly cast by removal of heat from the rolls.

A point of great difference between the DC casting method and the CC casting method is a cooling rate in casting. A feature of the CC casting method in which the cooling rate is high is in that the sizes of second phase particles in the CC casting method are smaller than those in the DC casting. In both the casting methods, each cooling rate in the casting is preferably set in a range of 0.1 to 1000° C./s. The setting of the cooling rate in the casting at 0.1 to 1000° C./s allows the amount of the solid solution of Fe to be increased, and enables the effect of improving strength to be obtained. In addition, a large number of second phase particles having a longest diameter of 3 µm or more are generated, the boundary length of the second phase particles is increased, and the effect of improving a fluttering characteristic can be obtained. A cooling rate of less than 0.1° C./s in the casting may result in a decrease in the amount of the solid solution of Fe and in a decrease in strength. In addition, the boundary length of the second phase particles having a longest diameter of 3 µm or more may be more than 800 mm/mm², the second phase particles may fall off, thereby generating large recesses, in etching, zincate treatment, cutting work, and grinding work, the smoothness of a plated surface may be deteriorated, and peeling of plating may also occur. In contrast, when the cooling rate in the casting is more than 1000° C./s, the boundary length of the second phase particles having a longest diameter of 3 µm or more may be less than 10 mm/mm², and a sufficient fluttering characteristic may be unable to be obtained.

Then, the cast aluminum alloy is subjected to homogenization treatment as needed (step S103). In the homogenization treatment, it is preferable to: (1) perform first-stage heat treatment at 500° C. or more for 0.5 hours or more, then perform cooling at a rate of 15° C./hour or more in a temperature range of 400° C. or more and less than 500° C., then perform cooling to 200° C. or less, then perform facing as needed, and further perform second-stage heat treatment at 400° C. or more for 20 hours or less; or (2) perform heat treatment once at 500° C. or more for 0.5 hours or more.

(1) The effect of suppressing a decrease in the amount of the solid solution of Fe, generating a large number of second phase particles having a longest diameter of 3 µm or more, increasing the boundary length of the second phase particles, and improving strength and a fluttering characteristic can be obtained by performing first-stage heat treatment at 500° C. or more for 0.5 hours or more, then performing cooling at a rate of 15° C./hour or more in a temperature range of 400° C. or more and less than 500° C., then performing cooling to 200° C. or less, then performing facing as needed, further performing second-stage heat treatment at 400° C. or more for 20 hours or less, and performing subsequent hot rolling under predetermined conditions, in the homogenization treatment, because the precipitation of an Al—Fe-based intermetallic compound most easily occurs in a temperature range in the neighborhood of 450° C.

When in the first-stage homogenization treatment, heating temperature is less than 500° C. or time is less than 0.5 hours, the amount of the solid solution of Fe may be less than 0.0010%, and sufficient proof stress may be unable to be obtained. The upper limit of the heating temperature in the first-stage homogenization treatment is not particularly limited; however, since an upper limit of more than 650° C. may cause melting, the upper limit is preferably set at 650° C. In addition, the upper limit of the heating time in the first-stage homogenization treatment is not particularly limited. However, even if the heating is performed for more than 24 hours, the effect is saturated, and it is impossible to obtain a further noticeable improvement effect. Therefore, the upper limit of the heating time is preferably set at 24 hours.

When the cooling rate in a temperature range of 400° C. or more and less than 500° C. is less than 15° C./hour, the amount of the solid solution of Fe may be less than 0.0010%, and sufficient proof stress may be unable to be obtained. When the heating temperature in the second-stage homogenization treatment is less than 400° C., the boundary length of second phase particles having a longest diameter of 3 µm or more may be less than 10 mm/mm², and a sufficient fluttering characteristic may be unable to be obtained. When the heating time in the second-stage homogenization treatment is more than 20 hours, the amount of the solid solution of Fe may be less than 0.0010%, and sufficient proof stress may be unable to be obtained.

(2) The effect of suppressing a decrease in the amount of the solid solution of Fe, generating a large number of second phase particles having a longest diameter of 3 μm or more, increasing the boundary length of the second phase particles, and improving strength and a fluttering characteristic can be obtained by performing heat treatment only once at 500° C. or more for 0.5 hours or more and performing subsequent hot rolling under predetermined conditions, in the homogenization treatment. When in the homogenization treatment, heating temperature is less than 500° C. or time is less than 0.5 hours, the amount of the solid solution of Fe may be less than 0.0010%, and sufficient proof stress may be unable to be obtained. The upper limit of the heating temperature in the homogenization treatment is not particularly limited; however, since an upper limit of more than 650° C. may cause melting, the upper limit is preferably set at 650° C.

Then, the aluminum alloy subjected to the homogenization treatment is hot-rolled to make a sheet material (step S104). When the hot rolling is performed, (1) in the case of performing the homogenization treatment, it is preferable that a hot-rolling start temperature is set at 300 to 550° C., the hot rolling in a temperature range of 390° C. or more and less than 500° C. is performed for 30 minutes or less, and a hot-rolling end temperature is set at less than 390° C. During the hot rolling, an intermetallic compound is in the state of being easily precipitated because of introduction of strain, a large amount of an Al—Fe-based intermetallic compound is precipitated in a short time in a temperature range of 390° C. or more and less than 500° C., and therefore, the setting of the time of the hot-rolling in the temperature range at 30 minutes or less can result in suppression of a decrease in the amount of the solid solution of Fe and can cause the effect of improving strength and a fluttering characteristic to be obtained.

When the time of the hot rolling in a temperature range of 390° C. or more and less than 500° C. is more than 30 minutes, the amount of the solid solution of Fe may be less than 0.0010%, and sufficient proof stress may be unable to be obtained. Therefore, the time of the hot rolling in a temperature range of 390° C. or more and less than 500° C. is preferably set at 30 minutes or less, and more preferably set at 20 minutes or less. When the hot-rolling end temperature is 390° C. or more, the strain introduced in the hot rolling is in the state of partly remaining, a large amount of an Al—Fe-based intermetallic compound is precipitated even in a short time, the amount of the solid solution of Fe in a core material may be less than 0.0010%, and sufficient proof stress may be unable to be obtained. Therefore, the hot-rolling end temperature is preferably set at less than 390° C., and more preferably set at 300° C. or less. The lower limit of the hot-rolling end temperature is not particularly limited; however, since the too low end temperature is prone to result in occurrence of a trouble such as edge cracking due to insufficient ductility during the hot rolling, the lower limit is preferably set at 100° C.

In contrast, (2) when the homogenization treatment is not performed, the hot-rolling start temperature is preferably set at less than 390° C. In the cast aluminum alloy ingot, the amount of the solid solution of Fe is large, and a large amount of an Al—Fe-based intermetallic compound also exists as a crystallized product. Therefore, a decrease in the amount of the solid solution of Fe can be suppressed, and the effect of improving strength and a fluttering characteristic can be obtained by setting the hot-rolling start temperature at less than 390° C. rather than in a temperature range in the neighborhood of 450° C. (390° C. or more and less than 500° C. in the case of the hot rolling) in which an Al—Fe-based intermetallic compound is easily precipitated. When the hot-rolling start temperature is 390° C. or more, the amount of the solid solution of Fe may be less than 0.0010%, and sufficient proof stress may be unable to be obtained. Therefore, the hot-rolling start temperature is preferably set at less than 390° C., and more preferably set at less than 350° C. The lower limit of the hot-rolling end temperature is not particularly limited; however, since the too low end temperature is prone to result in occurrence of a trouble such as edge cracking due to insufficient ductility during the hot rolling, the lower limit is preferably set at 100° C.

Then, cold rolling of the hot-rolled sheet material is performed to make an aluminum alloy sheet of around 1.3 mm to 0.45 mm (step S105). The sheet is finished to have a needed product sheet thickness by the cold rolling after the end of the hot rolling. The conditions of the cold rolling are not particularly limited but may be determined depending on a needed product sheet strength and sheet thickness, and a rolling reduction is preferably set at 10 to 95%. Before or in the cold rolling, annealing treatment may be performed to secure cold-rolling workability. The annealing treatment is preferably performed under conditions of 200° C. or more and less than 390° C., and 0.1 to 10 hours in the case of, for example, batch-type heating and is preferably performed under conditions of retention at 390° C. or more and less than 500° C. for 0 to 60 seconds, only in the case of performing homogenization treatment, in the case of continuous heating. In such a case, a treatment time of 0 second in the continuous type means that heating is stopped immediately after reaching a treatment temperature.

In order to work the aluminum alloy sheet for the magnetic disk, the aluminum alloy sheet is stamped in an annular shape to produce a disk blank (step S106). Then, the disk blank is subjected to pressurization annealing in atmospheric air, for example, at 100 to 450° C. for 30 minutes or more, to produce a flattened blank (step S107). Then, the blank is subjected to cutting work and grinding work to produce an aluminum alloy substrate (step S108). Then, a surface of the aluminum alloy substrate is subjected to degreasing, etching, and zincate treatment (Zn substitution treatment) (step S109). Then, the treated surface subjected to the zincate treatment is subjected to Ni—P plating treatment as undercoat treatment (step S110). Finally, a magnetic substance is deposited on the surface subjected to the Ni—P plating treatment by sputtering to make a magnetic disk (step S111).

Figure 2:
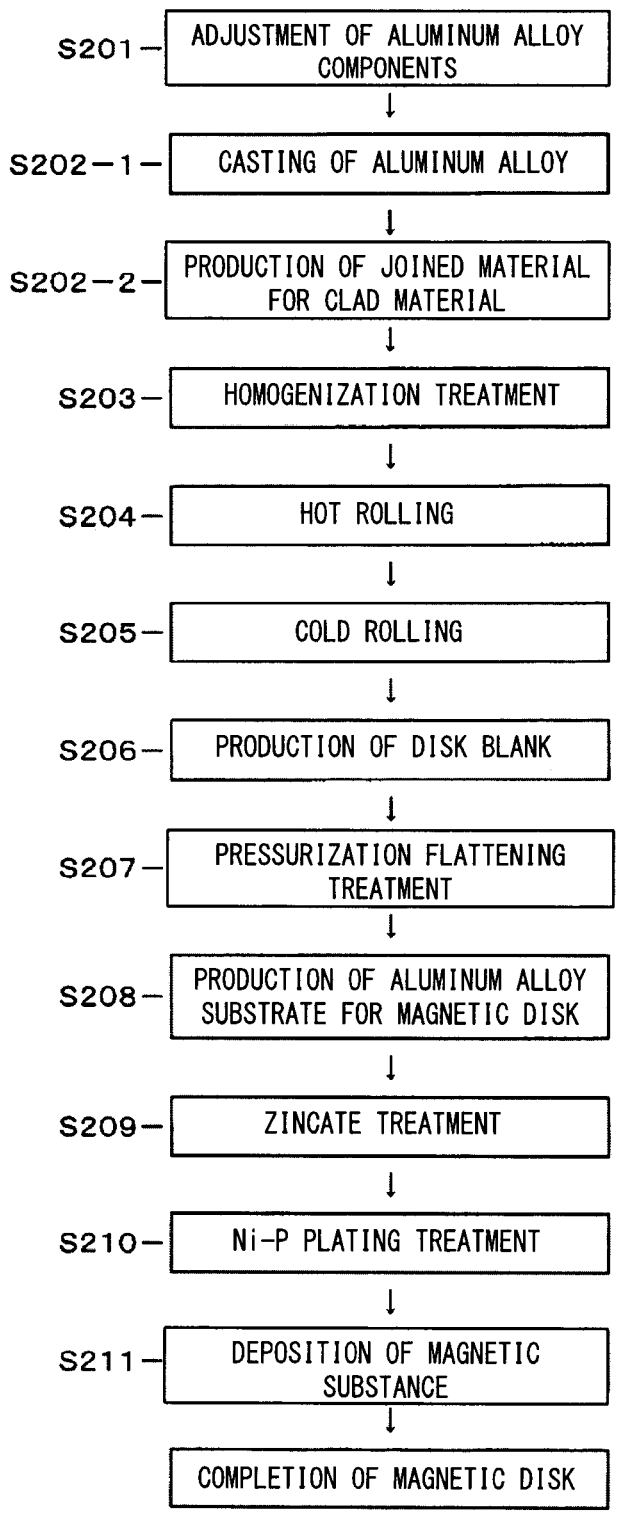
FIG. 2 is a flow diagram illustrating a method for producing an aluminum alloy substrate for a magnetic disk using a clad material according to the present disclosure.

A method for producing a magnetic disk using the aluminum alloy substrate for a magnetic disk, which is the clad material, will now be described with reference to a flow in FIG. 2. In such a case, preparation of an aluminum alloy (step S201) to cold rolling (step S205) are steps for producing an aluminum alloy substrate, and production of a disk blank (step S206) to deposition of a magnetic substance (step S211) are steps for making the produced aluminum alloy substrate into a magnetic disk.

First, for the core material and the sheath material, a molten metal of an aluminum alloy material having the component composition described above is prepared by heating and melting according to a usual method (step S201). Then, an aluminum alloy is cast from the molten metal of the aluminum alloy material, blended to have a desired composition, by a semi-continuous casting (DC casting) method, a continuous casting (CC casting) method, or the like (step S202-1).

In both the casting methods, each cooling rate in the casting of the core material is preferably set in a range of 0.1 to 1000° C./s in order to obtain the desired amount of the solid solution of Fe and the desired distribution of the second phase particles.

The setting of the cooling rate in the casting of the core material at 0.1 to 1000° C./s allows the amount of the solid solution of Fe to be increased, and enables the effect of improving strength to be obtained. In addition, a large number of second phase particles having a longest diameter of 3 μm or more are generated in the core material, the boundary length of the second phase particles is increased, and the effect of improving a fluttering characteristic can be obtained. A cooling rate of less than 0.1° C./s in the casting of the core material may result in a decrease in the amount of the solid solution of Fe and in a decrease in strength. In addition, the boundary length of the second phase particles having a longest diameter of 3 μm or more may be more than 800 mm/mm$^2$, the coarse second phase particles on a side of the substrate may fall off, thereby generating large recesses, in etching, zincate treatment, cutting work, and grinding work, and peeling of plating may occur in the boundary between the core material and the sheath material on the side of the substrate. In contrast, when the cooling rate in the casting is more than 1000° C./s, the boundary length of the second phase particles having a longest diameter of 3 μm or more may be less than 10 mm/mm$^2$, and a sufficient fluttering characteristic may be unable to be obtained.

Then, there are performed: a step of performing homogenization treatment of an ingot for a sheath material and hot-rolling the ingot to make desired sheath materials; and a step of facing an ingot for a core material to make a core material having a desired sheet thickness and joining the sheath materials to both surfaces of the core material to make a joined material (step S202-2).

When the aluminum alloy substrate for a magnetic disk, which is the clad material, is produced by a rolling pressure welding method, the subsequent pressure welding of the core material and the sheath materials can be favorably performed by removing an oxide film on the surfaces of the core material and the sheath material by mechanical removal such as facing or cutting, or chemical removal such as alkali cleaning (step S202-2).

For the sheath materials, an ingot obtained by a DC casting method, a CC casting method, or the like is faced and hot-rolled to make a sheet material having a predetermined size. Before the hot rolling, homogenization treatment may or may not be performed; however, when the homogenization treatment is performed, it is preferable to perform the homogenization treatment under conditions of 350 to 550° C., 1 hour or more, and the like. For the hot rolling for allowing the sheath materials to have a desired thickness, the conditions of the hot rolling are not particularly limited, but it is preferable to set a hot-rolling start temperature at 350 to 500° C. and to set a hot-rolling end temperature at 260 to 390° C. In addition, an oxide film generated in the hot-rolling step is removed to enable the favorable pressure welding of the core material by washing, only with nitric acid, caustic soda, or the like, the blank subjected to the hot rolling in order to allow the sheath materials to have the desired thickness (steps S202-1, S202-2).

In the present disclosure, the cladding rate of the sheath material (the rate of the single-sided thickness of the sheath materials with respect to the total thickness of the clad material) for cladding the core material and the sheath materials is not particularly limited but is set as appropriate according to needed product sheet strength, flatness, or a cutting depth, is preferably set at 3 to 30%, and is more preferably set at 5 to 20%. For example, a step of performing hot rolling to make sheath materials having a sheet thickness of around 15 mm is performed, an ingot for a core material is faced to make a core material having a sheet thickness of around 270 mm, and the sheath materials are joined to both surfaces of the core material to make a joined material.

Then, the cast aluminum alloy is subjected to homogenization treatment as needed (step S203). In the homogenization treatment, it is preferable to: (1) perform first-stage heat treatment at 500° C. or more for 0.5 hours or more, then perform cooling at a rate of 15° C./hour or more in a temperature range of 400° C. or more and less than 500° C., then perform cooling to 200° C. or less, then perform facing as needed, and further perform second-stage heat treatment at 400° C. or more for 20 hours or less; or (2) perform heat treatment once at 500° C. or more for 0.5 hours or more.

In the case of performing second-stage homogenization treatment in the above, the first-stage homogenization treatment of the core material is ended, the core material is then faced as needed, the sheath materials are joined to both the surfaces of the core material to make a joined material, and the joined material is subjected to the second-stage homogenization treatment. In the case of performing the homogenization treatment only once, the core material is faced as needed, the sheath materials are joined to both the surfaces of the core material to make a joined material before the homogenization treatment, and the homogenization treatment is performed only once. In the case of performing no homogenization treatment, the core material is faced, as needed, before the hot rolling, and the sheath materials are joined to both the surfaces of the core material to make a joined material.

(1) The effect of suppressing a decrease in the amount of the solid solution of Fe in the core material, generating a large number of second phase particles having a longest diameter of 3 μm or more, increasing the boundary length of the second phase particles, and improving strength and a fluttering characteristic can be obtained by performing first-stage heat treatment at 500° C. or more for 0.5 hours or more, then performing cooling at a rate of 15° C./hour or more in a temperature range of 400° C. or more and less than 500° C., then performing cooling to 200° C. or less, then performing facing as needed, further performing second-stage heat treatment at 400° C. or more for 20 hours or less, and performing subsequent hot rolling under predetermined conditions, in the homogenization treatment, because the precipitation of an Al—Fe-based intermetallic compound in the core material most easily occurs in a temperature range in the neighborhood of 450° C.

When in the first-stage homogenization treatment, heating temperature is less than 500° C. or time is less than 0.5 hours, the amount of the solid solution of Fe in the core material may be less than 0.0010%, and sufficient proof stress may be unable to be obtained. The upper limit of the heating temperature in the first-stage homogenization treatment is not particularly limited; however, since an upper limit of more than 650° C. may cause melting, the upper limit is preferably set at 650° C. In addition, the upper limit of the heating time in the first-stage homogenization treatment is not particularly limited. However, even if the heating is performed for more than 24 hours, the effect is saturated, and it is impossible to obtain a further noticeable improvement effect. Therefore, the upper limit of the heating time is preferably set at 24 hours.

When the cooling rate in a temperature range of 400° C. or more and less than 500° C. is less than 15° C./hour, the amount of the solid solution of Fe in the core material may be less than 0.0010%, and sufficient proof stress may be unable to be obtained. When the heating temperature in the second-stage homogenization treatment is less than 400° C., the boundary length of second phase particles having a longest diameter of 3 μm or more in the core material may be less than 10 mm/mm$^2$, and a sufficient fluttering characteristic may be unable to be obtained. When the heating time in the second-stage homogenization treatment is more than 20 hours, the amount of the solid solution of Fe in the core material may be less than 0.0010%, and sufficient proof stress may be unable to be obtained.

(2) The effect of suppressing a decrease in the amount of the solid solution of Fe in the core material, generating a large number of second phase particles having a longest diameter of 3 μm or more, increasing the boundary length of the second phase particles, and improving strength and a fluttering characteristic can be obtained by performing heat treatment only once at 500° C. or more for 0.5 hours or more and performing subsequent hot rolling under predetermined conditions, in the homogenization treatment. When in the homogenization treatment, heating temperature is less than 500° C. or time is less than 0.5 hours, the amount of the solid solution of Fe in the core material may be less than 0.0010%, and sufficient proof stress may be unable to be obtained. The upper limit of the heating temperature in the homogenization treatment is not particularly limited; however, since an upper limit of more than 650° C. may cause melting, the upper limit is preferably set at 650° C.

When the homogenization treatment of the joined material of the core material and the sheath materials is performed, it is necessary to suppress generation of an oxide film in the interfaces between the core material and the sheath materials as much as possible. For such a purpose, homogenization treatment of an aluminum alloy having composition in which an oxide film is prone to be generated is preferably performed in a non-oxidizing atmosphere such as, for example, an inert gas such as nitrogen gas or argon gas, a reducing gas such as carbon monoxide, or a gas under a reduced pressure such as a vacuum.

Then, the aluminum alloy subjected to the homogenization treatment is hot-rolled to make a sheet material (step S204). The core material and the sheath materials are cladded by performing the hot rolling. When the hot rolling is performed, (1) in the case of performing the homogenization treatment, it is preferable that a hot-rolling start temperature is set at 300 to 550° C., the hot rolling in a temperature range of 390° C. or more and less than 500° C. is performed for 30 minutes or less, and a hot-rolling end temperature is set at less than 390° C. During the hot rolling, an intermetallic compound is in the state of being easily precipitated because of introduction of strain, a large amount of an Al—Fe-based intermetallic compound is precipitated in a short time in a temperature range of 390° C. or more and less than 500° C., and therefore, the setting of the time of the hot-rolling in the temperature range at 30 minutes or less can result in suppression of a decrease in the amount of the solid solution of Fe in the core material and can cause the effect of improving strength and a fluttering characteristic to be obtained.

When the time of the hot rolling in a temperature range of 390° C. or more and less than 500° C. is more than 30 minutes, the amount of the solid solution of Fe in the core material may be less than 0.0010%, and sufficient proof stress may be unable to be obtained. Therefore, the time of the hot rolling in a temperature range of 390° C. or more and less than 500° C. is preferably set at 30 minutes or less, and more preferably set at 20 minutes or less. When the hot-rolling end temperature is 390° C. or more, the strain introduced in the hot rolling is in the state of partly remaining, a large amount of an Al—Fe-based intermetallic compound is precipitated even in a short time, the amount of the solid solution of Fe in the core material may be less than 0.0010%, and sufficient proof stress may be unable to be obtained. Therefore, the hot-rolling end temperature is preferably set at less than 390° C., and more preferably set at 300° C. or less. The lower limit of the hot-rolling end temperature is not particularly limited; however, since the too low end temperature is prone to result in occurrence of a trouble such as edge cracking due to insufficient ductility during the hot rolling, the lower limit is preferably set at 100° C.

In contrast, (2) when the homogenization treatment is not performed, the hot-rolling start temperature is preferably set at less than 390° C. In the cast aluminum alloy ingot of the core material, the amount of the solid solution of Fe is large, and a large amount of an Al—Fe-based intermetallic compound also exists as a crystallized product. Therefore, a decrease in the amount of the solid solution of Fe can be suppressed, and the effect of improving strength and a fluttering characteristic can be obtained by setting the hot-rolling start temperature at less than 390° C. rather than in a temperature range in the neighborhood of 450° C. (390° C. or more and less than 500° C. in the case of the hot rolling) in which an Al—Fe-based intermetallic compound is easily precipitated. When the hot-rolling start temperature is 390° C. or more, the amount of the solid solution of Fe in the core material may be less than 0.0010%, and sufficient proof stress may be unable to be obtained. Therefore, the hot-rolling start temperature is preferably set at less than 390° C., and more preferably set at less than 350° C. The lower limit of the hot-rolling end temperature is not particularly limited; however, since the too low end temperature is prone to result in occurrence of a trouble such as edge cracking due to insufficient ductility during the hot rolling, the lower limit is preferably set at 100° C. In such a case, the thickness of the sheet is set at around 3.0 mm.

Then, the aluminum alloy sheet obtained by the hot rolling is finished to have a desired product sheet thickness by cold rolling (step S205). The conditions of the cold rolling are not particularly limited but may be determined depending on a needed product sheet strength or sheet thickness, and a rolling reduction is preferably set at 10 to 95%.

Before or during the cold rolling, annealing treatment may be performed to secure cold-rolling workability. The annealing treatment is preferably performed under conditions of 200° C. or more and less than 390° C. and 0.1 to 10 hours in the case of, for example, batch-type heating. In such a case, it is preferable that the thickness of the sheet is in a range of around 1.3 mm to 0.45 mm.

In order to work the aluminum alloy sheet, which is the clad material, for the magnetic disk, the aluminum alloy sheet, which is the clad material, is stamped in an annular shape to produce a disk blank (step S206). Then, the disk blank is subjected to pressurization annealing in atmospheric air, for example, at 100° C. or more and 450° C. or less for 30 minutes or more, to produce a flattened blank, and then, the blank is subjected to cutting work and grinding work to produce an aluminum alloy substrate (step S208). Then, a surface of the aluminum alloy substrate is subjected to degreasing, etching, and zincate treatment (Zn substitution treatment) (step S209). Then, the treated surface subjected to the zincate treatment is subjected to Ni—P plating treatment as undercoat treatment (step S210). Finally, a magnetic substance is deposited on the surface subjected to the Ni—P plating treatment by sputtering to make a magnetic disk (step S211).

EXAMPLES

The present disclosure will be described in more detail below with reference to Examples. However, the present disclosure is not limited thereto.

1. Aluminum Alloy Substrate for Magnetic Disk, which is Bare Material

First, examples of the aluminum alloy substrate for a magnetic disk, which is a bare material, will be described. Each alloy material with component composition set forth in Table 1 to Table 3 was melted to make a molten aluminum alloy according to a usual method (step S101). In Tables 1 to 3, "-" denotes a measurement limit value or less.

TABLE 1

| Alloy No. | Fe | Mn | Si | Ni | Cu | Mg | Cr | Zr | Zn | Ti | B | V | Ti + B + V | Al + unavoidable impurities |
|---|---|---|---|---|---|---|---|---|---|---|---|---|---|---|
| A1 | 0.4 | — | — | — | — | — | — | — | — | — | — | — | 0.000 | Bal. |
| A2 | 0.6 | 0.2 | — | — | — | — | — | — | 0.230 | — | — | — | 0.000 | Bal. |
| A3 | 0.8 | — | 0.2 | — | — | — | — | — | 0.230 | — | — | — | 0.000 | Bal. |
| A4 | 0.9 | — | — | 0.2 | — | — | — | — | 0.230 | — | — | — | 0.000 | Bal. |
| A5 | 1.0 | — | — | — | 0.020 | — | — | — | 0.230 | — | — | — | 0.000 | Bal. |
| A6 | 1.2 | — | — | — | — | 0.2 | — | — | 0.230 | — | — | — | 0.000 | Bal. |
| A7 | 1.5 | — | — | — | — | — | 0.20 | — | 0.230 | — | — | — | 0.000 | Bal. |
| A8 | 1.8 | — | — | — | — | — | — | 0.20 | 0.230 | — | — | — | 0.000 | Bal. |
| A9 | 2.0 | — | — | — | — | — | — | — | 0.230 | — | — | — | 0.000 | Bal. |
| A10 | 2.9 | — | — | — | — | — | — | — | 0.230 | 0.060 | 0.001 | 0.020 | 0.081 | Bal. |
| A11 | 1.5 | 0.1 | — | — | — | — | — | — | 0.230 | — | — | — | 0.000 | Bal. |
| A12 | 1.5 | 0.3 | — | — | — | — | — | — | 0.230 | — | — | — | 0.000 | Bal. |
| A13 | 1.5 | 0.6 | — | — | — | — | — | — | 0.230 | — | — | — | 0.000 | Bal. |
| A14 | 1.5 | 1.5 | — | — | — | — | — | — | 0.230 | — | — | — | 0.000 | Bal. |
| A15 | 1.5 | 2.9 | — | — | — | — | — | — | 0.230 | — | — | — | 0.000 | Bal. |
| A16 | 1.5 | — | 0.1 | — | — | — | — | — | 0.230 | — | — | — | 0.000 | Bal. |
| A17 | 1.5 | — | 0.4 | — | — | — | — | — | 0.230 | — | — | — | 0.000 | Bal. |
| A18 | 1.5 | — | — | 0.1 | — | — | — | — | 0.230 | — | — | — | 0.000 | Bal. |
| A19 | 1.5 | — | — | 1.0 | — | — | — | — | 0.230 | — | — | — | 0.000 | Bal. |
| A20 | 1.5 | — | — | 2.9 | — | — | — | — | 0.230 | — | — | — | 0.000 | Bal. |
| A21 | 1.5 | — | — | — | 0.005 | — | — | — | 0.230 | — | — | — | 0.000 | Bal. |
| A22 | 1.5 | — | — | — | 0.020 | — | — | — | 0.230 | — | — | — | 0.000 | Bal. |
| A23 | 1.5 | — | — | — | 0.150 | — | — | — | 0.230 | — | — | — | 0.000 | Bal. |
| A24 | 1.5 | — | — | — | 0.950 | — | — | — | 0.230 | — | — | — | 0.000 | Bal. |
| A25 | 1.5 | — | — | — | — | 0.1 | — | — | 0.230 | — | — | — | 0.000 | Bal. |
| A26 | 1.5 | — | — | — | — | 0.9 | — | — | 0.230 | — | — | — | 0.000 | Bal. |
| A27 | 0.4 | — | — | — | — | 6.0 | — | — | 0.230 | — | — | — | 0.000 | Bal. |
| A28 | 1.5 | — | — | — | — | — | 0.01 | — | 0.230 | — | — | — | 0.000 | Bal. |
| A29 | 1.5 | — | — | — | — | — | 0.15 | — | 0.230 | — | — | — | 0.000 | Bal. |
| A30 | 1.5 | — | — | — | — | — | 0.95 | — | 0.230 | — | — | — | 0.000 | Bal. |

TABLE 2

| Alloy No. | Fe | Mn | Si | Ni | Cu | Mg | Cr | Zr | Zn | Ti | B | V | Ti + B + V | Al + unavoidable impurities |
|---|---|---|---|---|---|---|---|---|---|---|---|---|---|---|
| A31 | 1.5 | — | — | — | — | — | — | 0.01 | 0.230 | — | — | — | 0.000 | Bal. |
| A32 | 1.8 | — | — | — | — | — | — | 0.15 | 0.230 | — | — | — | 0.000 | Bal. |
| A33 | 1.8 | — | — | — | — | — | — | 0.95 | 0.230 | — | — | — | 0.000 | Bal. |
| A34 | 1.8 | — | — | — | — | — | — | — | 0.005 | — | — | — | 0.000 | Bal. |
| A35 | 1.5 | — | — | — | — | — | — | — | 0.350 | — | — | — | 0.000 | Bal. |
| A36 | 1.5 | — | — | — | — | — | — | — | 0.950 | — | — | — | 0.000 | Bal. |
| A37 | 0.8 | 0.3 | 0.1 | 0.1 | 0.020 | 0.3 | 0.15 | 0.15 | 0.350 | 0.005 | 0.001 | 0.001 | 0.007 | Bal. |
| A38 | 1.5 | 0.3 | 0.1 | 0.1 | 0.020 | 0.3 | 0.15 | 0.15 | 0.350 | 0.070 | 0.001 | 0.021 | 0.092 | Bal. |
| A39 | 2.3 | 0.3 | 0.1 | 0.1 | 0.020 | 0.3 | 0.15 | 0.15 | 0.350 | 0.454 | 0.023 | 0.012 | 0.489 | Bal. |
| A40 | 0.8 | 0.1 | — | — | — | — | — | — | — | — | — | — | 0.000 | Bal. |
| A41 | 1.5 | — | 0.2 | — | — | — | — | — | — | — | — | — | 0.000 | Bal. |
| A42 | 1.5 | — | — | 0.2 | — | — | — | — | — | — | — | — | 0.000 | Bal. |
| A43 | 1.5 | — | — | — | 0.020 | — | — | — | — | — | — | — | 0.000 | Bal. |
| A44 | 0.6 | — | — | — | — | — | — | — | 0.230 | — | — | — | 0.000 | Bal. |
| A45 | 0.6 | — | — | — | — | — | — | — | 0.230 | — | — | — | 0.000 | Bal. |
| A46 | 0.6 | — | — | — | — | — | — | — | 0.230 | — | — | — | 0.000 | Bal. |
| A47 | 0.6 | — | — | — | — | — | — | — | 0.230 | — | — | — | 0.000 | Bal. |
| A48 | 0.6 | — | — | — | — | — | — | — | 0.230 | — | — | — | 0.000 | Bal. |
| A49 | 0.6 | — | — | — | — | — | — | — | 0.230 | — | — | — | 0.000 | Bal. |
| A50 | 0.6 | — | — | — | — | — | — | — | 0.230 | — | — | — | 0.000 | Bal. |
| A51 | 0.6 | — | — | — | — | — | — | — | 0.230 | — | — | — | 0.000 | Bal. |
| A52 | 0.6 | — | — | — | — | — | — | — | 0.230 | — | — | — | 0.000 | Bal. |
| A53 | 0.6 | — | — | — | — | — | — | — | 0.230 | — | — | — | 0.000 | Bal. |
| A54 | 0.6 | — | — | — | — | — | — | — | 0.230 | — | — | — | 0.000 | Bal. |
| A55 | 0.6 | — | — | — | — | — | — | — | 0.230 | — | — | — | 0.000 | Bal. |
| A56 | 0.6 | — | — | — | — | — | — | — | 0.230 | — | — | — | 0.000 | Bal. |
| A57 | 0.6 | — | — | — | — | — | — | — | 0.230 | — | — | — | 0.000 | Bal. |
| A58 | 0.6 | — | — | — | — | — | — | — | 0.230 | — | — | — | 0.000 | Bal. |
| A59 | 0.6 | — | — | — | — | — | — | — | 0.230 | — | — | — | 0.000 | Bal. |
| A60 | 0.6 | — | — | — | — | — | — | — | 0.230 | — | — | — | 0.000 | Bal. |
| A61 | 0.6 | — | — | — | — | — | — | — | 0.230 | — | — | — | 0.000 | Bal. |
| A62 | 0.8 | — | — | — | — | — | — | — | — | — | — | — | 0.000 | Bal. |
| A63 | 1.2 | — | — | — | — | — | — | — | — | — | — | — | 0.000 | Bal. |

TABLE 2-continued

| Alloy No. | Component Composition (mass %) | | | | | | | | | | | | Al + unavoidable impurities |
|---|---|---|---|---|---|---|---|---|---|---|---|---|---|
| | Fe | Mn | Si | Ni | Cu | Mg | Cr | Zr | Zn | Ti | B | V | Ti + B + V | |
| A64 | 2.9 | — | — | — | — | — | — | — | — | — | — | — | 0.000 | Bal. |
| A65 | 0.6 | — | — | — | — | — | — | — | 0.230 | — | — | — | 0.000 | Bal. |

TABLE 3

| Alloy No. | Component Composition (mass %) | | | | | | | | | | | | | Al + unavoidable impurities |
|---|---|---|---|---|---|---|---|---|---|---|---|---|---|---|
| | Fe | Mn | Si | Ni | Cu | Mg | Cr | Zr | Zn | Ti | B | V | Ti + B + V | |
| AC1 | 0.2 | — | — | — | — | — | — | — | — | — | — | — | 0.000 | Bal. |
| AC2 | 0.2 | — | — | — | — | — | — | — | — | — | — | — | 0.000 | Bal. |
| AC3 | 0.3 | — | — | — | — | — | — | — | — | — | — | — | 0.000 | Bal. |
| AC4 | 3.5 | — | — | — | — | — | — | — | — | — | — | — | 0.000 | Bal. |
| AC5 | 4.0 | — | — | — | — | — | — | — | — | — | — | — | 0.000 | Bal. |
| AC6 | 0.8 | 3.5 | — | — | — | — | — | — | — | — | — | — | 0.000 | Bal. |
| AC7 | 0.8 | — | 0.7 | — | — | — | — | — | — | — | — | — | 0.000 | Bal. |
| AC8 | 0.8 | — | — | 3.6 | — | — | — | — | — | — | — | — | 0.000 | Bal. |
| AC9 | 0.8 | — | — | — | 1.520 | — | — | — | — | — | — | — | 0.000 | Bal. |
| AC10 | 0.8 | — | — | — | — | 7.2 | — | — | — | — | — | — | 0.000 | Bal. |
| AC11 | 0.8 | — | — | — | — | — | 1.40 | — | — | — | — | — | 0.000 | Bal. |
| AC12 | 0.8 | — | — | — | — | — | — | 1.38 | — | — | — | — | 0.000 | Bal. |
| AC13 | 0.8 | — | — | — | — | — | — | — | 1.520 | — | — | — | 0.000 | Bal. |

Then, molten aluminum alloys in alloys Nos. A1 to A26, A28 to A31, A35 to A64, AC1, and AC3 to AC13 were cast by a DC casting method, and molten aluminum alloys in alloys Nos. A27, A32 to A34, A65, and AC2 were cast by a CC casting method to produce ingots as set forth in Tables 4 to 6 (step S102). Both surfaces of each of the ingots of the alloys Nos. A36 to A43, A54, A55, A57, A59 to A61, and AC3 were faced in 15 mm.

TABLE 4

| | | Casting Conditions | | Ingot | Conditions of Homogenization Treatment | | |
|---|---|---|---|---|---|---|---|
| | | | | | First-Stage | First-Stage | Cooling Rate in Temperature Range of 400° C. or |
| | Alloy No. | Casting Method | Casting Velocity (mm/min) | Sheet Thickness (mm) | Heating Temperature (° C.) | Retention Time (hr) | More and Less Than 500° C. (° C./hr) |
| Example 1 | A1 | DC | 30 | 300 | 630 | 0.5 | 15.2 |
| Example 2 | A2 | DC | 30 | 300 | 620 | 1 | 15.4 |
| Example 3 | A3 | DC | 30 | 300 | 630 | 0.5 | 17.4 |
| Example 4 | A4 | DC | 30 | 300 | 500 | 5 | 30.7 |
| Example 5 | A5 | DC | 30 | 300 | 550 | 10 | 45.1 |
| Example 6 | A6 | DC | 30 | 300 | 550 | 15 | 32.1 |
| Example 7 | A7 | DC | 30 | 300 | 550 | 24 | 31.9 |
| Example 8 | A8 | DC | 30 | 300 | 550 | 5 | 30.8 |
| Example 9 | A9 | DC | 30 | 300 | 550 | 5 | 30.7 |
| Example 10 | A10 | DC | 30 | 300 | 550 | 5 | 30.1 |
| Example 11 | A11 | DC | 40 | 300 | 550 | 5 | 30.9 |
| Example 12 | A12 | DC | 40 | 300 | 550 | 5 | 34.2 |
| Example 13 | A13 | DC | 40 | 300 | 550 | 5 | 32.1 |
| Example 14 | A14 | DC | 40 | 300 | 550 | 5 | 31.1 |
| Example 15 | A15 | DC | 20 | 300 | 550 | 5 | 32.1 |
| Example 16 | A16 | DC | 20 | 300 | 550 | 5 | 31.7 |
| Example 17 | A17 | DC | 20 | 300 | 550 | 5 | 31.5 |
| Example 18 | A18 | DC | 40 | 300 | 550 | 5 | 31.4 |
| Example 19 | A19 | DC | 50 | 300 | 550 | 5 | 29.8 |
| Example 20 | A20 | DC | 40 | 300 | 550 | 5 | 28.9 |
| Example 21 | A21 | DC | 50 | 300 | 550 | 5 | 30.7 |

TABLE 4-continued

| | | | | | | | |
|---|---|---|---|---|---|---|---|
| Example 22 | A22 | DC | 50 | 300 | 550 | 5 | 30.1 |
| Example 23 | A23 | DC | 50 | 300 | 550 | 5 | 30.9 |
| Example 24 | A24 | DC | 50 | 300 | 550 | 5 | 29.9 |
| Example 25 | A25 | DC | 50 | 300 | 550 | 5 | 29.5 |
| Example 26 | A26 | DC | 50 | 300 | 550 | 5 | 30.5 |
| Example 27 | A27 | CC | 1000 | 3 | 550 | 5 | 30.4 |
| Example 28 | A28 | DC | 50 | 300 | 550 | 5 | 31.7 |
| Example 29 | A29 | DC | 50 | 300 | 550 | 5 | 31.1 |
| Example 30 | A30 | DC | 50 | 300 | 550 | 5 | 30.5 |

| | Conditions of Homogenization Treatment | | Conditions of Hot Rolling | | |
|---|---|---|---|---|---|
| | Second-Stage Heating Temperature (° C.) | Second-Stage Retention Time (hr) | Hot-Rolling Start Temperature (° C.) | Hot-Rolling End Temperature (° C.) | Time of Hot Rolling in Temperature Range of 390° C. or More and Less Than 500° C. (min) |
| Example 1 | 400 | 1 | 390 | 190 | 15 |
| Example 2 | 400 | 1 | 310 | 160 | — |
| Example 3 | 490 | 5 | 480 | 370 | 23 |
| Example 4 | 450 | 15 | 440 | 280 | 20 |
| Example 5 | 400 | 19 | 440 | 270 | 19 |
| Example 6 | 450 | 10 | 440 | 260 | 19 |
| Example 7 | 450 | 10 | 440 | 310 | 18 |
| Example 8 | 450 | 10 | 440 | 300 | 15 |
| Example 9 | 450 | 10 | 440 | 280 | 15 |
| Example 10 | 450 | 10 | 440 | 280 | 15 |
| Example 11 | 450 | 10 | 440 | 300 | 15 |
| Example 12 | 450 | 10 | 440 | 300 | 15 |
| Example 13 | 450 | 10 | 440 | 290 | 15 |
| Example 14 | 450 | 10 | 440 | 300 | 15 |
| Example 15 | 450 | 10 | 440 | 300 | 15 |
| Example 16 | 450 | 10 | 440 | 280 | 15 |
| Example 17 | 450 | 10 | 440 | 280 | 13 |
| Example 18 | 450 | 10 | 440 | 290 | 15 |
| Example 19 | 450 | 10 | 440 | 280 | 15 |
| Example 20 | 450 | 10 | 440 | 300 | 18 |
| Example 21 | 450 | 10 | 440 | 280 | 17 |
| Example 22 | 450 | 10 | 440 | 280 | 15 |
| Example 23 | 450 | 10 | 440 | 300 | 15 |
| Example 24 | 450 | 10 | 440 | 290 | 15 |
| Example 25 | 450 | 10 | 440 | 300 | 15 |
| Example 26 | 450 | 10 | 440 | 280 | 15 |
| Example 27 | 450 | 10 | 440 | 290 | 15 |
| Example 28 | 450 | 10 | 440 | 300 | 18 |
| Example 29 | 450 | 10 | 440 | 300 | 15 |
| Example 30 | 450 | 10 | 440 | 290 | 18 |

TABLE 5

| | | Casting Conditions | | Ingot | Conditions of Homogenization Treatment | | |
|---|---|---|---|---|---|---|---|
| | Alloy No. | Casting Method | Casting Velocity (mm/min) | Sheet Thickness (mm) | First-Stage Heating Temperature (° C.) | First-Stage Retention Time (hr) | Cooling Rate in Temperature Range of 400° C. or More and Less Than 500° C. (° C./hr) |
| Example 31 | A31 | DC | 50 | 300 | 550 | 5 | 31.1 |
| Example 32 | A32 | CC | 1400 | 6 | 550 | 5 | 30.4 |
| Example 33 | A33 | CC | 1000 | 3 | 550 | 5 | 30.5 |
| Example 34 | A34 | CC | 800 | 3 | 550 | 5 | 31.7 |
| Example 35 | A35 | DC | 60 | 300 | 550 | 5 | 31.1 |
| Example 36 | A36 | DC | 60 | 300 | 600 | 5 | — |
| Example 37 | A37 | DC | 50 | 300 | 600 | 5 | — |
| Example 38 | A38 | DC | 50 | 300 | 510 | 5 | — |
| Example 39 | A39 | DC | 50 | 300 | 510 | 5 | — |
| Example 40 | A40 | DC | 50 | 300 | — | — | — |
| Example 41 | A41 | DC | 50 | 300 | — | — | — |

TABLE 5-continued

| | | | | | | | |
|---|---|---|---|---|---|---|---|
| Example 42 | A42 | DC | 50 | 300 | — | — | — |
| Example 43 | A43 | DC | 50 | 300 | — | — | — |
| Example 44 | A44 | DC | 50 | 300 | 450 | 5 | 30.4 |
| Example 45 | A45 | DC | 50 | 300 | 470 | 5 | 30.6 |
| Example 46 | A46 | DC | 50 | 300 | 510 | 0.1 | 31.7 |
| Example 47 | A47 | DC | 50 | 300 | 510 | 0.2 | 30.8 |
| Example 48 | A48 | DC | 50 | 300 | 550 | 5 | 9.1 |
| Example 49 | A49 | DC | 50 | 300 | 550 | 5 | 8.8 |
| Example 50 | A50 | DC | 50 | 300 | 550 | 5 | 30.5 |
| Example 51 | A51 | DC | 50 | 300 | 550 | 5 | 30.2 |
| Example 52 | A52 | DC | 50 | 300 | 550 | 5 | 31.7 |
| Example 53 | A53 | DC | 50 | 300 | 550 | 5 | 31.7 |
| Example 54 | A54 | DC | 50 | 300 | — | — | — |
| Example 55 | A55 | DC | 50 | 300 | — | — | — |
| Example 56 | A56 | DC | 50 | 300 | 550 | 5 | 30.5 |
| Example 57 | A57 | DC | 50 | 300 | 510 | 5 | — |
| Example 58 | A58 | DC | 50 | 300 | 550 | 5 | 30.8 |
| Example 59 | A59 | DC | 50 | 300 | 510 | 5 | — |
| Example 60 | A60 | DC | 50 | 300 | 470 | 5 | — |
| Example 61 | A61 | DC | 50 | 300 | 510 | 0.2 | — |
| Example 62 | A62 | DC | 50 | 300 | 550 | 5 | 31.1 |
| Example 63 | A63 | DC | 50 | 300 | 550 | 5 | 31.1 |
| Example 64 | A64 | DC | 50 | 300 | 550 | 5 | 31.1 |
| Example 65 | A65 | CC | 800 | 3 | — | — | — |

| | Conditions of Homogenization Treatment | | Conditions of Hot Rolling | | |
|---|---|---|---|---|---|
| | Second-Stage Heating Temperature (° C.) | Second-Stage Retention Time (hr) | Hot-Rolling Start Temperature (° C.) | Hot-Rolling End Temperature (° C.) | Time of Hot Rolling in Temperature Range of 390° C. or More and Less Than 500° C. (min) |
| Example 31 | 450 | 10 | 440 | 280 | 15 |
| Example 32 | 450 | 10 | 440 | 290 | 15 |
| Example 33 | 450 | 10 | 440 | 300 | 15 |
| Example 34 | 450 | 10 | 440 | 280 | 15 |
| Example 35 | 450 | 10 | 440 | 280 | 17 |
| Example 36 | — | — | 540 | 290 | 15 |
| Example 37 | — | — | 530 | 300 | 15 |
| Example 38 | — | — | 500 | 290 | 15 |
| Example 39 | — | — | 400 | 300 | 15 |
| Example 40 | — | — | 370 | 240 | — |
| Example 41 | — | — | 340 | 230 | — |
| Example 42 | — | — | 300 | 200 | — |
| Example 43 | — | — | 280 | 120 | — |
| Example 44 | 450 | 10 | 440 | 290 | 15 |
| Example 45 | 450 | 10 | 440 | 290 | 15 |
| Example 46 | 450 | 10 | 440 | 300 | 15 |
| Example 47 | 450 | 10 | 440 | 300 | 18 |
| Example 48 | 450 | 10 | 440 | 290 | 15 |
| Example 49 | 450 | 10 | 440 | 290 | 15 |
| Example 50 | 350 | 10 | 340 | 290 | — |
| Example 51 | 370 | 10 | 360 | 290 | — |
| Example 52 | 450 | 22 | 440 | 290 | 15 |
| Example 53 | 450 | 24 | 440 | 290 | 15 |
| Example 54 | — | — | 430 | 230 | 15 |
| Example 55 | — | — | 450 | 240 | 15 |
| Example 56 | 450 | 10 | 440 | 400 | 15 |
| Example 57 | — | — | 500 | 430 | 15 |
| Example 58 | 450 | 10 | 440 | 300 | 38 |
| Example 59 | — | — | 500 | 300 | 45 |
| Example 60 | — | — | 420 | 310 | 15 |
| Example 61 | — | — | 400 | 300 | 15 |
| Example 62 | 450 | 10 | 440 | 280 | 15 |
| Example 63 | 450 | 10 | 440 | 280 | 15 |
| Example 64 | 450 | 10 | 440 | 280 | 15 |
| Example 65 | — | — | 370 | 240 | — |

TABLE 6

| | Alloy No. | Casting Conditions | | Ingot | Conditions of Homogenization Treatment | | |
|---|---|---|---|---|---|---|---|
| | | Casting Method | Casting Velocity (mm/min) | Sheet Thickness (mm) | First-Stage Heating Temperature (° C.) | First-Stage Retention Time (hr) | Cooling Rate in Temperature Range of 400° C. or More and Less Than 500° C. (° C./hr) |
| Comparative Example 1 | AC1 | DC | 30 | 300 | 550 | 5 | 30.1 |
| Comparative Example 2 | AC2 | CC | 600 | 3 | 550 | 5 | 30.2 |
| Comparative Example 3 | AC3 | DC | 30 | 300 | 550 | 5 | — |
| Comparative Example 4 | AC4 | DC | 30 | 300 | 550 | 5 | 30.6 |
| Comparative Example 5 | AC5 | DC | 30 | 300 | 550 | 5 | 29.8 |
| Comparative Example 6 | AC6 | DC | 30 | 300 | 550 | 5 | 30.1 |
| Comparative Example 7 | AC7 | DC | 30 | 300 | 550 | 5 | 30.3 |
| Comparative Example 8 | AC8 | DC | 30 | 300 | 550 | 5 | 30.1 |
| Comparative Example 9 | AC9 | DC | 30 | 300 | 550 | 5 | 30.5 |
| Comparative Example 10 | AC10 | DC | 30 | 300 | 550 | 5 | 30.1 |
| Comparative Example 11 | AC11 | DC | 30 | 300 | 550 | 5 | 30.1 |
| Comparative Example 12 | AC12 | DC | 30 | 300 | 550 | 5 | 30.6 |
| Comparative Example 13 | AC13 | DC | 30 | 300 | 550 | 5 | 30.2 |

| | Conditions of Homogenization Treatment | | Conditions of Hot Rolling | | |
|---|---|---|---|---|---|
| | Second-Stage Heating Temperature (° C.) | Second-Stage Retention Time (hr) | Hot-Rolling Start Temperature (° C.) | Hot-Rolling End Temperature (° C.) | Time of Hot Rolling in Temperature Range of 390° C. or More and Less Than 500° C. (min) |
| Comparative Example 1 | 450 | 10 | 440 | 280 | 15 |
| Comparative Example 2 | 450 | 10 | 440 | 280 | 15 |
| Comparative Example 3 | — | — | 440 | 280 | 15 |
| Comparative Example 4 | 450 | 10 | 440 | 280 | 15 |
| Comparative Example 5 | 450 | 10 | 440 | 280 | 15 |
| Comparative Example 6 | 450 | 10 | 440 | 280 | 15 |
| Comparative Example 7 | 450 | 10 | 440 | 280 | 15 |
| Comparative Example 8 | 450 | 10 | 440 | 280 | 15 |
| Comparative Example 9 | 450 | 10 | 440 | 280 | 15 |
| Comparative Example 10 | 450 | 10 | 440 | 280 | 15 |
| Comparative Example 11 | 450 | 10 | 440 | 280 | 15 |
| Comparative Example 12 | 450 | 10 | 440 | 280 | 15 |
| Comparative Example 13 | 450 | 10 | 440 | 280 | 15 |

Then, homogenization treatment was performed under conditions set forth in Table 4 to Table 6 (step S103). The alloys Nos. A40 to A43, A54, A55, and A65 were not subjected to the homogenization treatment. Moreover, both surfaces of each of the ingots of the alloys Nos. A1 to A26, A28 to A31, A35, A44 to 53, A56, A58, A62 to A64, AC1, and AC4 to AC13, among the alloys subjected to the second-stage homogenization treatment as well as the first-stage homogenization treatment, were faced in 15 mm before the second-stage homogenization treatment. In the case of performing the second-stage homogenization treatment, a temperature-raising rate to a heating temperature was set at 40° C./h. Then, hot rolling was performed under the conditions set forth in Table 4 to Table 6 to make a hot-rolled sheet having a sheet thickness of 2.0 mm (step S104). Moreover, the alloys Nos. A36 to 39, A57, and A59 to 61 were subjected to the homogenization treatment by performing the above-mentioned heat treatment only once.

In the case of performing the homogenization treatment, a temperature decrease rate from a final heating temperature to a hot-rolling start temperature was set at 30° C./h. After the hot rolling, the hot-rolled sheets of the alloys Nos. A1, A3, A5, and AC1 were subjected to annealing (batch type) under conditions of 360° C. and 2 hours. All the hot-rolled sheets produced in such a manner were rolled to have a final sheet thickness of 0.8 mm by cold rolling (rolling reduction of 60.0%), to make aluminum alloy sheets (step S105). Disk blanks were stamped and produced to have an annular shape with an outer diameter of 96 mm and an inner diameter of 24 mm from the aluminum alloy sheets (step S106).

Each of the disk blanks produced in such a manner was subjected to pressurization annealing at 300° C. for 3 hours (step S107). The disk blank was subjected to end-surface preparation to have an outer diameter of 95 mm and an inner diameter of 25 mm and subjected to grinding work (grinding of surface of 10 μm) (step S108). Then, the disk blank was degreased at 60° C. for 5 minutes by AD-68F (trade name, manufactured by C. Uyemura & Co., Ltd.), etched at 65° C. for 1 minute by AD-107F (trade name, manufactured by C. Uyemura & Co., Ltd.), and further desmutted with 30% $HNO_3$ aqueous solution (room temperature) for 20 seconds (step S109).

The disk blank of which a surface state had been prepared in such a manner was immersed in a zincate treatment liquid, at 20° C., of AD-301F-3X (trade name, manufactured by C. Uyemura & Co., Ltd.) for 0.5 minute to perform zincate treatment of the surface (step S109). The zincate treatment was performed twice in total, and the disk blank was immersed in 30% $HNO_3$ aqueous solution at room temperature for 20 seconds between such zincate treatments to subject the surface to peeling treatment. The surface subjected to the zincate treatment was electroless plated with Ni—P of 17 μm in thickness using an electroless Ni—P plating treatment liquid (NIMUDEN HDX (trade name, manufactured by C. Uyemura & Co., Ltd.)) and then subjected to final polishing (polishing quantity of 4 μm) by a fabric (step S110).

The aluminum alloy ingot after the casting (step S102) step, the aluminum alloy sheet after the cold rolling (step S105), the aluminum alloy substrate after the grinding work (step S108) step, and the aluminum alloy substrate after the plating treatment polishing (step S110) step were subjected to the following evaluations. Plating treatment of two disks was performed in each sample. In the disks of Comparative Examples 4 to 13, however, plating peeling occurred, and therefore, it was impossible to measure disk flutter. Plating peeling occurred in one of the two disks in Examples 1, and 62 to 64, but the evaluations were performed using the disk in which the plating peeling had not occurred.

[Cooling Rate in Casting]

The dendrite arm spacing (DAS) of the ingot after the casting (step S102) was measured to calculate a cooling rate (° C./s) in the casting. A cross-sectional structure in an ingot thickness direction was observed with an optical microscope, and the DAS was measured by a secondary arm method. The cross section of the center in the thickness direction of the ingot was used for the measurement.

[Proof Stress]

Proof stress was measured in conformity with JIS Z2241 by performing annealing (pressurization annealing simulated heating), at 300° C. for 3 hours, of the aluminum alloy sheet subjected to the cold rolling (step S105), heating the aluminum alloy sheet in atmospheric air at 300° C. for 3 hours, sampling JIS No. 5 test pieces along the rolling direction, and setting n=2. In the evaluation of the strength, a proof stress of 45 MPa or more was evaluated as A (excellent), a proof stress of 35 MPa or more and less than 45 MPa was evaluated as B (good), a proof stress of 30 MPa or more and less than 35 MPa was evaluated as C (fair), and a proof stress of less than 30 MPa was evaluated as D (poor). The plating of the aluminum alloy substrate and the magnetic disk after the grinding work was peeled to sample a test piece from the substrate of which the surface of 10 μm was ground. It is also possible to evaluate proof stress by heating the test piece in atmospheric air at 300° C. for 3 hours. As the dimensions of the test piece in such a case, the width of a parallel portion is set at 5±0.14 mm, the original gage length of the test piece is set at 10 mm, the radius of the shoulder is set at 2.5 mm, and the length of the parallel portion is set at 15 mm.

[Amount of Solid Solution of Fe]

The amount of the solid solution of Fe was measured by the following procedure using the aluminum alloy substrate subjected to the grinding work (step S108). The total amount of precipitated Fe in the aluminum alloy substrate was analyzed and measured from a residue obtained by a heat phenol dissolution extraction method, and a value obtained by subtracting the total amount from the value measured by analyzing an Fe component was regarded as the amount of the solid solution of Fe. A method for analyzing the amount of precipitated Fe was performed with reference to academic literatures in "Sato, Izumi: Abstracts of the 68th Spring Conference of the Japan Institute of Light Metals, (1985) 55." and academic literatures in "Muramatsu, Matsuo, Komatsu, and others: Abstracts of the 76th Spring Conference of the Japan Institute of Light Metals, (1989), 51.".

The heat phenol dissolution extraction method will be described. From the aluminum alloy substrate, 2 g of a test piece was sampled. For the test piece, a small piece was cut from the aluminum alloy substrate and weighed to have a total of 2 g. Then, a beaker in which 50 mL of phenol was put was placed on a hot plate, and phenol was heated to 170 to 180° C., followed by putting and dissolving the test piece in the phenol. Then, the beaker in which such a solution was put was transferred from a location on the hot plate, and was cooled. Then, benzyl alcohol was added to the cooled solution in order to prevent solidification. Then, the solution to the benzyl alcohol had been added was filtered through a membrane filter (pore diameter of 0.1 μm) made of polytetrafluoroethylene, to obtain an Al—Fe-based intermetallic compound as a residue. Then, Si in the residue obtained by the heat phenol dissolution extraction method was dissolved in a 10%-NaOH solution, and Fe was dissolved in a liquid mixture obtained by adding aqua regia (at a volume ratio between concentrated hydrochloric acid and concentrated nitric acid, of 3:1) to such a solution. In such a manner, the liquid mixture containing dissolved Si and Fe was obtained. Then, the liquid mixture was quantified and analyzed by an inductive coupling plasma emission analysis method (ICP). As a result, the amount of Fe precipitated as an Al—Fe-based intermetallic compound was determined.

Then, the amount of precipitated Fe obtained by the heat phenol dissolution extraction method was regarded as the total amount of precipitated Fe. A value obtained by subtracting the amount of the total amount of precipitated Fe from the value measured by analyzing an Fe component in the aluminum alloy substrate was regarded as the amount of the solid solution of Fe.

[Longest Diameter and Boundary Length of Second Phase Particles]

A cross section of the aluminum alloy substrate subjected to the grinding work (step S108) was polished, followed by observing 1 mm² with an optical microscope at 400 times to measure the longest diameter and boundary length (mm/mm²) of the second phase particles by using particle analysis software A-ZO-KUN (trade name, manufactured by Asahi Kasei Engineering Corporation). The cross section of the center in the thickness direction of the substrate was used for the measurement.

[Measurement of Disk Flutter]

Disk flutter was measured using the aluminum alloy substrate subjected to the plating treatment polishing (step S110) step. The disk flutter was measured by placing the aluminum alloy substrate on a commercially available hard disk drive in the presence of air. ST2000 (trade name) manufactured by Seagate was used as the drive, and a motor to which SLD102 (trade name) manufactured by Techno Alive Co. was directly connected was driven. Plural disks at a rotation number set at 7200 rpm were always placed, and the vibrations of a surface of the top magnetic disk of the disks were observed with LDV1800 (trade name), as a laser Doppler meter, manufactured by ONO SOKKI CO., LTD. The observed vibrations were subjected to spectrum analysis with an FFT analysis apparatus DS3200 (trade name) manufactured by ONO SOKKI CO., LTD. The observation was performed by observing the disk surface through a hole opened in the lid of the hard disk drive. In addition, a squeeze plate placed in the commercially available hard disk was removed, and the evaluation was performed.

A fluttering characteristic was evaluated with the maximum displacement (disk fluttering (nm)) of a broad peak in the vicinity of 300 to 1500 Hz at which fluttering appears. Such a broad peak, referred to as non-repeatable run out (NRRO), has been found to greatly influence the positioning error of a head. In air, a fluttering characteristic of 30 nm or less was evaluated as A (excellent), a fluttering characteristic of more than 30 nm and 40 nm or less was evaluated as B (good), a fluttering characteristic of more than 40 nm and 50 nm or less was evaluated as C (fair), and a fluttering characteristic of more than 50 nm was evaluated as D (poor).

The above evaluation results are set forth in Tables 7 to 9.

TABLE 7

| | Alloy No. | Cooling Rate in Casting (° C./s) | Boundary Length of Second Phase Particles Having Longest Diameter of 3 μm Or More (mm/mm²) | Amount of Solid Solution of Fe (mass %) | Strength Proof Stress (MPa) | Evaluation | Fluttering Characteristic |
|---|---|---|---|---|---|---|---|
| Example 1 | A1 | 0.5 | 22 | 0.0019 | 33 | C | B |
| Example 2 | A2 | 0.4 | 38 | 0.0030 | 45 | A | A |
| Example 3 | A3 | 0.6 | 87 | 0.0042 | 49 | A | A |
| Example 4 | A4 | 0.7 | 90 | 0.0032 | 53 | A | A |
| Example 5. | A5 | 0.5 | 105 | 0.0035 | 56 | A | A |
| Example 6 | A6 | 0.7 | 129 | 0.0043 | 61 | A | A |
| Example 7 | A7 | 0.3 | 143 | 0.0042 | 68 | A | A |
| Example 8 | A8 | 0.6 | 182 | 0.0038 | 74 | A | A |
| Example 9 | A9 | 0.4 | 239 | 0.0038 | 81 | A | A |
| Example 10 | A10 | 0.5 | 780 | 0.0042 | 85 | A | A |
| Example 11 | A11 | 0.8 | 163 | 0.0038 | 74 | A | A |
| Example 12 | A12 | 0.8 | 164 | 0.0042 | 85 | A | A |
| Example 13 | A13 | 0.9 | 150 | 0.0043 | 89 | A | A |
| Example 14 | A14 | 0.8 | 153 | 0.0040 | 93 | A | A |
| Example 15 | A15 | 0.2 | 139 | 0.0038 | 95 | A | A |
| Example 16 | A16 | 0.2 | 130 | 0.0043 | 74 | A | A |
| Example 17 | A17 | 0.2 | 123 | 0.0038 | 76 | A | A |
| Example 18 | A18 | 0.8 | 146 | 0.0039 | 75 | A | A |
| Example 19 | A19 | 0.8 | 157 | 0.0043 | 89 | A | A |
| Example 20 | A20 | 0.9 | 172 | 0.0042 | 95 | A | A |
| Example 21 | A21 | 1.0 | 164 | 0.0043 | 72 | A | A |
| Example 22 | A22 | 0.8 | 157 | 0.0038 | 75 | A | A |
| Example 23 | A23 | 1.2 | 168 | 0.0039 | 83 | A | A |
| Example 24 | A24 | 0.8 | 159 | 0.0043 | 98 | A | A |
| Example 25 | A25 | 0.9 | 153 | 0.0039 | 68 | A | A |
| Example 26 | A26 | 0.8 | 150 | 0.0038 | 83 | A | A |
| Example 27 | A27 | 554.0 | 12 | 0.0043 | 145 | A | C |
| Example 28 | A28 | 0.8 | 156 | 0.0039 | 70 | A | A |
| Example 29 | A29 | 0.9 | 144 | 0.0038 | 75 | A | A |
| Example 30 | A30 | 0.8 | 159 | 0.0038 | 85 | A | A |

TABLE 8

| | Alloy No. | Cooling Rate in Casting (° C./s) | Boundary Length of Second Phase Particles Having Longest Diameter of 3 μm Or More (mm/mm²) | Amount of Solid Solution of Fe (mass %) | Proof Stress (MPa) | Strength Evaluation | Fluttering Characteristic |
|---|---|---|---|---|---|---|---|
| Example 31 | A31 | 0.8 | 183 | 0.0038 | 89 | A | A |
| Example 32 | A32 | 253.0 | 140 | 0.0042 | 148 | A | A |
| Example 33 | A33 | 831.0 | 120 | 0.0038 | 172 | A | A |
| Example 34 | A34 | 954.3 | 134 | 0.0039 | 75 | A | A |
| Example 35 | A35 | 1.1 | 154 | 0.0038 | 72 | A | A |
| Example 36 | A36 | 1.2 | 134 | 0.0043 | 77 | A | A |
| Example 37 | A37 | 0.8 | 60 | 0.0045 | 47 | A | A |
| Example 38 | A38 | 0.9 | 178 | 0.0042 | 74 | A | A |
| Example 39 | A39 | 0.8 | 230 | 0.0046 | 89 | A | A |
| Example 40 | A40 | 0.8 | 42 | 0.0022 | 40 | B | A |
| Example 41 | A41 | 0.9 | 109 | 0.0058 | 65 | A | A |
| Example 42 | A42 | 0.8 | 98 | 0.0138 | 68 | A | A |
| Example 43 | A43 | 0.9 | 90 | 0.0338 | 67 | A | A |
| Example 44 | A44 | 0.9 | 68 | 0.0009 | 33 | C | A |
| Example 45 | A45 | 0.9 | 72 | 0.0008 | 32 | C | A |
| Example 46 | A46 | 0.8 | 73 | 0.0007 | 33 | C | A |
| Example 47 | A47 | 0.8 | 72 | 0.0009 | 32 | C | A |
| Example 48 | A48 | 0.04 | 60 | 0.0009 | 32 | C | A |
| Example 49 | A49 | 0.8 | 60 | 0.0007 | 30 | C | A |
| Example 50 | A50 | 0.9 | 15 | 0.0042 | 48 | A | c |
| Example 51 | A51 | 0.8 | 16 | 0.0038 | 49 | A | c |
| Example 52 | A52 | 0.8 | 65 | 0.0009 | 32 | C | A |
| Example 53 | A53 | 0.9 | 68 | 0.0008 | 33 | C | A |
| Example 54 | A54 | 0.9 | 71 | 0.0007 | 32 | C | A |
| Example 55 | A55 | 0.8 | 61 | 0.0009 | 31 | C | A |
| Example 56 | A56 | 0.9 | 69 | 0.0007 | 33 | C | A |
| Example 57 | A57 | 0.8 | 58 | 0.0009 | 33 | C | A |
| Example 58 | A58 | 0.8 | 59 | 0.0008 | 34 | C | A |
| Example 59 | A59 | 0.8 | 61 | 0.0009 | 33 | C | A |
| Example 60 | A60 | 0.9 | 62 | 0.0007 | 32 | C | A |
| Example 61 | A61 | 0.8 | 60 | 0.0009 | 32 | C | A |
| Example 62 | A62 | 0.6 | 62 | 0.0041 | 48 | A | A |
| Example 63 | A63 | 0.7 | 109 | 0.0041 | 60 | A | A |
| Example 64 | A64 | 0.5 | 731 | 0.0042 | 83 | A | A |
| Example 65 | A65 | 971.0 | 65 | 0.0432 | 82 | A | C |

TABLE 9

| | Alloy No. | Cooling Rate in Casting (° C./s) | Boundary Length of Second Phase Particles Having Longest Diameter of 3 μm Or More (mm/mm²) | Amount of Solid Solution of Fe (mass %) | Proof Stress (MPa) | Strength Evaluation | Fluttering Characteristic |
|---|---|---|---|---|---|---|---|
| Comparative Example 1 | AC1 | 0.4 | 5 | 0.0025 | 27 | D | D |
| Comparative Example 2 | AC2 | 1032.0 | 4 | 0.0027 | 27 | D | D |
| Comparative Example 3 | AC3 | 0.5 | 7 | 0.0028 | 28 | D | D |
| Comparative Example 4 | AC4 | 0.5 | 830 | 0.0038 | 103 | A | — |
| Comparative Example 5 | AC5 | 0.3 | 881 | 0.0035 | 106 | A | — |
| Comparative Example 6 | AC6 | 0.4 | 921 | 0.0039 | 102 | A | — |
| Comparative Example 7 | AC7 | 0.5 | 987 | 0.0035 | 89 | A | — |
| Comparative Example 8 | AC8 | 0.5 | 934 | 0.0042 | 92 | A | — |
| Comparative Example 9 | AC9 | 0.3 | 923 | 0.0043 | 95 | A | — |
| Comparative Example 10 | AC10 | 0.4 | 852 | 0.0038 | 131 | A | — |
| Comparative Example 11 | AC11 | 0.5 | 875 | 0.0035 | 98 | A | — |

TABLE 9-continued

| | Alloy No. | Cooling Rate in Casting (° C./s) | Boundary Length of Second Phase Particles Having Longest Diameter of 3 μm Or More (mm/mm²) | Amount of Solid Solution of Fe (mass %) | Strength Proof Stress (MPa) | Evaluation | Fluttering Characteristic |
|---|---|---|---|---|---|---|---|
| Comparative Example 12 | AC12 | 0.4 | 867 | 0.0045 | 132 | A | — |
| Comparative Example 13 | AC13 | 0.5 | 231 | 0.0048 | 83 | A | — |

As set forth in Tables 7 to 9, Examples 1 to 65 were able to result in favorable strength and fluttering characteristic.

In contrast, Comparative Examples 1 to 3 resulted in poor strength and poor fluttering characteristic due to the too small content of Fe in an aluminum alloy.

Comparative Examples 4 and 5 resulted in occurrence of plating peeling in such a manner as described above due to the too large content of Fe in an aluminum alloy, and were inappropriate for a magnetic disk.

Comparative Example 6 resulted in occurrence of plating peeling in such a manner as described above due to the too large content of Mn in an aluminum alloy, and was inappropriate for a magnetic disk.

Comparative Example 7 resulted in occurrence of plating peeling in such a manner as described above due to the too large content of Si in an aluminum alloy, and was inappropriate for a magnetic disk.

Comparative Example 8 resulted in occurrence of plating peeling in such a manner as described above due to the too large content of Ni in an aluminum alloy, and was inappropriate for a magnetic disk.

Comparative Example 9 resulted in occurrence of plating peeling in such a manner as described above due to the too large content of Cu in an aluminum alloy, and was inappropriate for a magnetic disk.

Comparative Example 10 resulted in occurrence of plating peeling in such a manner as described above due to the too large content of Mg in an aluminum alloy, and was inappropriate for a magnetic disk.

Comparative Example 11 resulted in occurrence of plating peeling in such a manner as described above due to the too large content of Cr in an aluminum alloy, and was inappropriate for a magnetic disk.

Comparative Example 12 resulted in occurrence of plating peeling in such a manner as described above due to the too large content of Zr in an aluminum alloy, and was inappropriate for a magnetic disk.

Comparative Example 13 resulted in occurrence of plating peeling in such a manner as described above due to the too large content of Zn in an aluminum alloy, and was inappropriate for a magnetic disk.

2. Aluminum Alloy Substrate for Magnetic Disk, which is Clad Material

Examples of the aluminum alloy substrate for a magnetic disk, which is a clad material, will now be described.

Each alloy with component composition set forth in Tables 10 to 15 was melted to make a molten aluminum alloy according to a usual method (step S201). In Tables 10 to 15, "-" denotes a measurement limit value or less.

TABLE 10

| Alloy No. | Component Composition (mass %) | | | | | | | | | | | | | Al + unavoidable impurities |
|---|---|---|---|---|---|---|---|---|---|---|---|---|---|---|
| | Fe | Mn | Si | Ni | Cu | Mg | Cr | Zr | Zn | Ti | B | V | Ti + B + V | |
| B1 | 0.4 | — | — | — | — | — | — | — | — | — | — | — | 0.000 | Bal. |
| B2 | 0.6 | 0.2 | — | — | — | — | — | — | 0.230 | — | — | — | 0.000 | Bal. |
| B3 | 0.8 | — | 0.2 | — | — | — | — | — | 0.230 | — | — | — | 0.000 | Bal. |
| B4 | 0.9 | — | — | 0.2 | — | — | — | — | 0.230 | — | — | — | 0.000 | Bal. |
| B5 | 1.0 | — | — | — | 0.020 | — | — | — | 0.230 | — | — | — | 0.000 | Bal. |
| B6 | 1.2 | — | — | — | — | 0.2 | — | — | 0.230 | — | — | — | 0.000 | Bal. |
| B7 | 1.5 | — | — | — | — | — | 0.20 | — | 0.230 | — | — | — | 0.000 | Bal. |
| B8 | 1.8 | — | — | — | — | — | — | 0.20 | 0.230 | — | — | — | 0.000 | Bal. |
| B9 | 2.0 | — | — | — | — | — | — | — | 0.230 | — | — | — | 0.000 | Bal. |
| B10 | 2.9 | — | — | — | — | — | — | — | 0.230 | 0.060 | 0.001 | 0.020 | 0.081 | Bal. |
| B11 | 1.5 | 0.1 | — | — | — | — | — | — | 0.230 | — | — | — | 0.000 | Bal. |
| B12 | 1.5 | 0.3 | — | — | — | — | — | — | 0.230 | — | — | — | 0.000 | Bal. |
| B13 | 1.5 | 0.6 | — | — | — | — | — | — | 0.230 | — | — | — | 0.000 | Bal. |
| B14 | 1.5 | 1.5 | — | — | — | — | — | — | 0.230 | — | — | — | 0.000 | Bal. |
| B15 | 1.5 | 2.9 | — | — | — | — | — | — | 0.230 | — | — | — | 0.000 | Bal. |
| B16 | 1.5 | — | 0.1 | — | — | — | — | — | 0.230 | — | — | — | 0.000 | Bal. |
| B17 | 1.5 | — | 0.4 | — | — | — | — | — | 0.230 | — | — | — | 0.000 | Bal. |
| B18 | 1.5 | — | — | 0.1 | — | — | — | — | 0.230 | — | — | — | 0.000 | Bal. |
| B19 | 1.5 | — | — | 1.0 | — | — | — | — | 0.230 | — | — | — | 0.000 | Bal. |
| B20 | 1.5 | — | — | 2.9 | — | — | — | — | 0.230 | — | — | — | 0.000 | Bal. |
| B21 | 1.5 | — | — | — | 0.005 | — | — | — | 0.230 | — | — | — | 0.000 | Bal. |
| B22 | 1.5 | — | — | — | 0.020 | — | — | — | 0.230 | — | — | — | 0.000 | Bal. |
| B23 | 1.5 | — | — | — | 0.150 | — | — | — | 0.230 | — | — | — | 0.000 | Bal. |
| B24 | 1.5 | — | — | — | 0.950 | — | — | — | 0.230 | — | — | — | 0.000 | Bal. |
| B25 | 1.5 | — | — | — | — | 0.1 | — | — | 0.230 | — | — | — | 0.000 | Bal. |
| B26 | 1.5 | — | — | — | — | 0.9 | — | — | 0.230 | — | — | — | 0.000 | Bal. |

TABLE 10-continued

| Alloy No. | Component Composition (mass %) | | | | | | | | | | | | Al + unavoidable impurities |
|---|---|---|---|---|---|---|---|---|---|---|---|---|---|
| | Fe | Mn | Si | Ni | Cu | Mg | Cr | Zr | Zn | Ti | B | V | Ti + B + V | |
| B27 | 0.4 | — | — | — | — | 6.0 | — | — | 0.230 | — | — | — | 0.000 | Bal. |
| B28 | 1.5 | — | — | — | — | — | 0.01 | — | 0.230 | — | — | — | 0.000 | Bal. |
| B29 | 1.5 | — | — | — | — | — | 0.15 | — | 0.230 | — | — | — | 0.000 | Bal. |
| B30 | 1.5 | — | — | — | — | — | 0.95 | — | 0.230 | — | — | — | 0.000 | Bal. |

TABLE 11

| Alloy No. | Component Composition (mass %) | | | | | | | | | | | | | Al + unavoidable impurities |
|---|---|---|---|---|---|---|---|---|---|---|---|---|---|---|
| | Fe | Mn | Si | Ni | Cu | Mg | Cr | Zr | Zn | Ti | B | V | Ti + B + V | |
| B31 | 1.5 | — | — | — | — | — | — | 0.01 | 0.230 | — | — | — | 0.000 | Bal. |
| B32 | 1.8 | — | — | — | — | — | — | 0.15 | 0.230 | — | — | — | 0.000 | Bal. |
| B33 | 1.8 | — | — | — | — | — | — | 0.95 | 0.230 | — | — | — | 0.000 | Bal. |
| B34 | 1.8 | — | — | — | — | — | — | — | 0.005 | — | — | — | 0.000 | Bal. |
| B35 | 1.5 | — | — | — | — | — | — | — | 0.350 | — | — | — | 0.000 | Bal. |
| B36 | 1.5 | — | — | — | — | — | — | — | 0.950 | — | — | — | 0.000 | Bal. |
| B37 | 0.8 | 0.3 | 0.1 | 0.1 | 0.020 | 0.3 | 0.15 | 0.15 | 0.350 | 0.005 | 0.001 | 0.001 | 0.007 | Bal. |
| B38 | 1.5 | 0.3 | 0.1 | 0.1 | 0.020 | 0.3 | 0.15 | 0.15 | 0.350 | 0.070 | 0.001 | 0.021 | 0.092 | Bal. |
| B39 | 2.3 | 0.3 | 0.1. | 0.1 | 0.020 | 0.3 | 0.15 | 0.15 | 0.350 | 0.454 | 0.023 | 0.012 | 0.489 | Bal. |
| B40 | 0.8 | 0.1 | — | — | — | — | — | — | — | — | — | — | 0.000 | Bal. |
| B41 | 1.5 | — | 0.2 | — | — | — | — | — | — | — | — | — | 0.000 | Bal. |
| B42 | 1.5 | — | — | 0.2 | — | — | — | — | — | — | — | — | 0.000 | Bal. |
| B43 | 1.5 | — | — | — | 0.020 | — | — | — | — | — | — | — | 0.000 | Bal. |
| B44 | 0.6 | — | — | — | — | — | — | — | 0.230 | — | — | — | 0.000 | Bal. |
| B45 | 0.6 | — | — | — | — | — | — | — | 0.230 | — | — | — | 0.000 | Bal. |
| B46 | 0.6 | — | — | — | — | — | — | — | 0.230 | — | — | — | 0.000 | Bal. |
| B47 | 0.6 | — | — | — | — | — | — | — | 0.230 | — | — | — | 0.000 | Bal. |
| B48 | 0.6 | — | — | — | — | — | — | — | 0.230 | — | — | — | 0.000 | Bal. |
| B49 | 0.6 | — | — | — | — | — | — | — | 0.230 | — | — | — | 0.000 | Bal. |
| B50 | 0.6 | — | — | — | — | — | — | — | 0.230 | — | — | — | 0.000 | Bal. |
| B51 | 0.6 | — | — | — | — | — | — | — | 0.230 | — | — | — | 0.000 | Bal. |
| B52 | 0.6 | — | — | — | — | — | — | — | 0.230 | — | — | — | 0.000 | Bal. |
| B53 | 0.6 | — | — | — | — | — | — | — | 0.230 | — | — | — | 0.000 | Bal. |
| B54 | 0.6 | — | — | — | — | — | — | — | 0.230 | — | — | — | 0.000 | Bal. |
| B55 | 0.6 | — | — | — | — | — | — | — | 0.230 | — | — | — | 0.000 | Bal. |
| B56 | 0.6 | — | — | — | — | — | — | — | 0.230 | — | — | — | 0.000 | Bal. |
| B57 | 0.6 | — | — | — | — | — | — | — | 0.230 | — | — | — | 0.000 | Bal. |
| B58 | 0.6 | — | — | — | — | — | — | — | 0.230 | — | — | — | 0.000 | Bal. |
| B59 | 0.6 | — | — | — | — | — | — | — | 0.230 | — | — | — | 0.000 | Bal. |
| B60 | 0.6 | — | — | — | — | — | — | — | 0.230 | — | — | — | 0.000 | Bal. |
| B61 | 0.6 | — | — | — | — | — | — | — | 0.230 | — | — | — | 0.000 | Bal. |
| B62 | 0.8 | — | — | — | — | — | — | — | — | — | — | — | 0.000 | Bal. |
| B63 | 1.2 | — | — | — | — | — | — | — | — | — | — | — | 0.000 | Bal. |
| B64 | 2.9 | — | — | — | — | — | — | — | — | — | — | — | 0.000 | Bal. |
| B65 | 0.6 | — | — | — | — | — | — | — | 0.230 | — | — | — | 0.000 | Bal. |

TABLE 12

| Alloy No. | Component Composition (mass %) | | | | | | | | | | | | | Al + unavoidable impurities |
|---|---|---|---|---|---|---|---|---|---|---|---|---|---|---|
| | Fe | Mn | Si | Ni | Cu | Mg | Cr | Zr | Zn | Ti | B | V | Ti + B + V | |
| BC1 | 0.2 | — | — | — | — | — | — | — | — | — | — | — | 0.000 | Bal. |
| BC2 | 0.2 | — | — | — | — | — | — | — | — | — | — | — | 0.000 | Bal. |
| BC3 | 0.3 | — | — | — | — | — | — | — | — | — | — | — | 0.000 | Bal. |
| BC4 | 3.5 | — | — | — | — | — | — | — | — | — | — | — | 0.000 | Bal. |
| BC5 | 4.0 | — | — | — | — | — | — | — | — | — | — | — | 0.000 | Bal. |
| BC6 | 0.8 | 3.5 | — | — | — | — | — | — | — | — | — | — | 0.000 | Bal. |
| BC7 | 0.8 | — | 0.7 | — | — | — | — | — | — | — | — | — | 0.000 | Bal. |
| BC8 | 0.8 | — | — | 3.6 | — | — | — | — | — | — | — | — | 0.000 | Bal. |
| BC9 | 0.8 | — | — | — | 1.520 | — | — | — | — | — | — | — | 0.000 | Bal. |
| BC10 | 0.8 | — | — | — | — | 7.2 | — | — | — | — | — | — | 0.000 | Bal. |
| BC11 | 0.8 | — | — | — | — | — | 1.40 | — | — | — | — | — | 0.000 | Bal. |

TABLE 12-continued

Component Composition (mass %)

| Alloy No. | Fe | Mn | Si | Ni | Cu | Mg | Cr | Zr | Zn | Ti | B | V | Ti + B + V | Al + unavoidable impurities |
|---|---|---|---|---|---|---|---|---|---|---|---|---|---|---|
| BC12 | 0.8 | — | — | — | — | — | — | 1.38 | — | — | — | — | 0.000 | Bal. |
| BC13 | 0.8 | — | — | — | — | — | — | — | 1.520 | — | — | — | 0.000 | Bal. |

TABLE 13

Sheath Material Component Composition (mass %)

| Alloy No. | Mg | Cu | Zn | Cr | Fe | Si | Mn | Al + unavoidable impurities |
|---|---|---|---|---|---|---|---|---|
| C1 | 0.5 | 0.078 | 0.210 | 0.172 | 0.021 | 0.002 | — | Bal. |
| C2 | 1.2 | 0.057 | 0.120 | 0.055 | 0.020 | 0.021 | — | Bal. |
| C3 | 2.3 | 0.083 | 0.580 | 0.015 | 0.007 | 0.029 | — | Bal. |
| C4 | 3.1 | 0.006 | 0.060 | 0.180 | 0.029 | 0.025 | — | Bal. |
| C5 | — | 0.001 | 0.001 | 0.001 | 0.281 | 0.003 | — | Bal. |
| C6 | — | 0.001 | 0.001 | — | 0.002 | 0.273 | — | Bal. |
| C7 | 0.3 | 0.020 | 0.590 | 0.284 | 0.022 | 0.007 | — | Bal. |
| C8 | 0.5 | 0.078 | 0.210 | 0.172 | 0.021 | 0.002 | — | Bal. |
| C9 | 4.2 | 0.066 | 0.260 | 0.050 | 0.016 | 0.023 | 0.20 | Bal. |
| C10 | 4.4 | 0.123 | 0.500 | 0.100 | 0.002 | 0.012 | 0.02 | Bal. |
| C11 | 5.4 | 0.542 | 0.390 | 0.070 | 0.008 | 0.004 | — | Bal. |
| C12 | 5.7 | 0.080 | 0.230 | 0.291 | 0.023 | 0.005 | — | Bal. |
| C13 | 4.3 | 0.125 | 0.160 | 0.030 | 0.020 | 0.002 | — | Bal. |
| C14 | 4.2 | 0.066 | 0.260 | 0.050 | 0.261 | 0.023 | — | Bal. |
| C15 | 4.4 | 0.123 | 0.500 | 0.100 | 0.002 | 0.012 | — | Bal. |
| C16 | 4.2 | 0.057 | 0.120 | 0.055 | 0.020 | 0.021 | — | Bal. |
| C17 | 4.4 | 0.123 | 0.500 | 0.100 | 0.002 | 0.012 | — | Bal. |
| C18 | 3.6 | 0.060 | 0.006 | 0.183 | 0.022 | 0.007 | — | Bal. |
| C19 | 4.2 | 0.123 | 0.280 | 0.212 | 0.017 | 0.007 | — | Bal. |
| C20 | 4.2 | 0.018 | 0.490 | 0.240 | 0.025 | 0.002 | — | Bal. |
| C21 | 4.4 | 0.123 | 0.500 | 0.100 | 0.008 | 0.012 | — | Bal. |
| C22 | 4.7 | 0.043 | 0.150 | 0.020 | 0.027 | 0.223 | — | Bal. |
| C23 | 3.9 | 0.088 | 0.280 | 0.190 | 0.020 | 0.020 | — | Bal. |
| C24 | 4.2 | 0.057 | 0.120 | 0.055 | 0.020 | 0.021 | — | Bal. |
| C25 | 4.4 | 0.123 | 0.500 | 0.100 | 0.002 | 0.012 | — | Bal. |
| C26 | 4.2 | 0.057 | 0.120 | 0.055 | 0.020 | 0.021 | — | Bal. |
| C27 | — | 0.532 | 0.007 | 0.001 | 0.032 | 0.003 | — | Bal. |
| C28 | — | 0.007 | 0.543 | 0.001 | 0.032 | 0.010 | — | Bal. |
| C29 | 3.1 | 0.006 | 0.060 | 0.180 | 0.029 | 0.025 | — | Bal. |
| C30 | 3.1 | 0.142 | 0.230 | 0.100 | 0.016 | 0.029 | — | Bal. |

TABLE 14

Sheath Material Component Composition (mass %)

| Alloy No. | Mg | Cu | Zn | Cr | Fe | Si | Mn | Al + unavoidable impurities |
|---|---|---|---|---|---|---|---|---|
| C31 | 4.3 | 0.123 | 0.390 | 0.291 | 0.029 | 0.023 | — | Bal. |
| C32 | 4.2 | 0.083 | 0.230 | 0.180 | 0.020 | 0.002 | — | Bal. |
| C33 | 3.1 | 0.006 | 0.060 | 0.180 | 0.029 | 0.025 | — | Bal. |
| C34 | 7.9 | 0.057 | 0.120 | 0.055 | 0.020 | 0.021 | — | Bal. |
| C35 | 3.8 | 0.067 | 0.450 | 0.110 | 0.026 | 0.013 | — | Bal. |
| C36 | 3.2 | 0.043 | 0.440 | 0.183 | 0.017 | 0.020 | — | Bal. |
| C37 | 3.1 | 0.006 | 0.060 | 0.180 | 0.029 | 0.025 | — | Bal. |
| C38 | 3.1 | 0.006 | 0.060 | 0.180 | 0.029 | 0.025 | — | Bal. |
| C39 | 3.1 | 0.006 | 0.060 | 0.180 | 0.029 | 0.025 | — | Bal. |
| C40 | 3.1 | 0.006 | 0.060 | 0.180 | 0.029 | 0.025 | — | Bal. |
| C41 | 3.1 | 0.006 | 0.060 | 0.180 | 0.029 | 0.025 | — | Bal. |
| C42 | 3.1 | 0.006 | 0.060 | 0.180 | 0.029 | 0.025 | — | Bal. |
| C43 | 3.1 | 0.006 | 0.060 | 0.180 | 0.029 | 0.025 | — | Bal. |
| C44 | 0.5 | 0.083 | 0.230 | 0.180 | 0.032 | 0.021 | — | Bal. |
| C45 | 0.5 | 0.083 | 0.230 | 0.180 | 0.032 | 0.021 | — | Bal. |
| C46 | 0.5 | 0.083 | 0.230 | 0.180 | 0.032 | 0.021 | — | Bal. |
| C47 | 0.5 | 0.083 | 0.230 | 0.180 | 0.032 | 0.021 | — | Bal. |
| C48 | 0.5 | 0.083 | 0.230 | 0.180 | 0.032 | 0.021 | — | Bal. |
| C49 | 0.5 | 0.083 | 0.230 | 0.180 | 0.032 | 0.021 | — | Bal. |
| C50 | 2.0 | 0.083 | 0.230 | 0.180 | 0.032 | 0.021 | — | Bal. |
| C51 | 2.0 | 0.083 | 0.230 | 0.180 | 0.032 | 0.021 | — | Bal. |
| C52 | 0.5 | 0.083 | 0.230 | 0.180 | 0.032 | 0.021 | — | Bal. |
| C53 | 0.5 | 0.083 | 0.230 | 0.180 | 0.032 | 0.021 | — | Bal. |
| C54 | 0.5 | 0.083 | 0.230 | 0.180 | 0.032 | 0.021 | — | Bal. |
| C55 | 0.5 | 0.083 | 0.230 | 0.180 | 0.032 | 0.021 | — | Bal. |
| C56 | 0.5 | 0.083 | 0.230 | 0.180 | 0.032 | 0.021 | — | Bal. |
| C57 | 0.5 | 0.083 | 0.230 | 0.180 | 0.032 | 0.021 | — | Bal. |
| C58 | 0.5 | 0.083 | 0.230 | 0.180 | 0.032 | 0.021 | — | Bal. |
| C59 | 0.5 | 0.083 | 0.230 | 0.180 | 0.032 | 0.021 | — | Bal. |
| C60 | 0.5 | 0.083 | 0.230 | 0.180 | 0.032 | 0.021 | — | Bal. |
| C61 | 0.5 | 0.083 | 0.230 | 0.180 | 0.032 | 0.021 | — | Bal. |
| C62 | 0.5 | 0.083 | 0.230 | 0.180 | 0.032 | 0.021 | — | Bal. |
| C63 | 0.5 | 0.083 | 0.230 | 0.180 | 0.032 | 0.021 | — | Bal. |
| C64 | 0.5 | 0.083 | 0.230 | 0.180 | 0.032 | 0.021 | — | Bal. |
| C65 | 0.5 | 0.083 | 0.230 | 0.180 | 0.032 | 0.021 | — | Bal. |

TABLE 15

Sheath Material Component Composition (mass %)

| Alloy No. | Mg | Cu | Zn | Cr | Fe | Si | Mn | Al + unavoidable impurities |
|---|---|---|---|---|---|---|---|---|
| CC1 | 0.5 | 0.078 | 0.210 | 0.172 | 0.021 | 0.002 | — | Bal. |
| CC2 | 0.5 | 0.078 | 0.210 | 0.172 | 0.021 | 0.002 | — | Bal. |
| CC3 | 0.5 | 0.078 | 0.210 | 0.172 | 0.021 | 0.002 | — | Bal. |
| CC4 | 0.5 | 0.078 | 0.210 | 0.172 | 0.021 | 0.002 | — | Bal. |
| CC5 | 0.5 | 0.078 | 0.210 | 0.172 | 0.021 | 0.002 | — | Bal. |
| CC6 | 0.5 | 0.078 | 0.210 | 0.172 | 0.021 | 0.002 | — | Bal. |
| CC7 | 0.5 | 0.078 | 0.210 | 0.172 | 0.021 | 0.002 | — | Bal. |
| CC8 | 0.5 | 0.078 | 0.210 | 0.172 | 0.021 | 0.002 | — | Bal. |
| CC9 | 0.5 | 0.078 | 0.210 | 0.172 | 0.021 | 0.002 | — | Bal. |
| CC10 | 0.5 | 0.078 | 0.210 | 0.172 | 0.021 | 0.002 | — | Bal. |
| CC11 | 0.5 | 0.078 | 0.210 | 0.172 | 0.021 | 0.002 | — | Bal. |
| CC12 | 0.5 | 0.078 | 0.210 | 0.172 | 0.021 | 0.002 | — | Bal. |
| CC13 | 0.5 | 0.078 | 0.210 | 0.172 | 0.021 | 0.002 | — | Bal. |

As set forth in Tables 16 to 18, ingots were produced as ingots for core materials from molten aluminum alloys of the alloys Nos. B1 to B26, B28 to B31, B35 to B64, BC1, and BC3-to BC13 by a DC casting method and from molten aluminum alloys of the alloys Nos. B27, B32 to B34, B65, and BC2 by a CC method (step S202-1). Ingots for sheath materials were produced from all the alloys by a DC casting method. For the core materials of the alloys Nos. B36 to B43, B54, B55, B57, B59 to B61, and BC3, both surfaces of the ingots were faced in 15 mm to make the core materials (step S202-2). For the sheath materials, both surfaces of the ingots were faced in 15 mm, and the ingots were subjected to homogenization treatment in atmospheric air at 520° C. for 6 hours and hot-rolled to make hot-rolled sheets having a sheet thickness of 15 mm from the alloys Nos. C1 to C26, C28 to C31, C35 to C61, CC1, and CC3 to CC13, and to make hot-rolled sheets having a sheet thickness of 1.5 mm from the alloys Nos. C27, C32 to C34, C65, and CC2. Then, the hot-rolled sheets were washed only with caustic soda to make the sheath materials, and the sheath materials were joined to both surfaces of the core materials to make joined materials.

As set forth in Tables 16 to 18, homogenization treatment was further performed (step S203). In Tables 16 to 18, the alloys Nos. B1 to B35, B44 to B53, B56, B58, B62 to 64, BC1, BC2, and BC4 to 13 were subjected to first-stage heat treatment at 500° C. or more for 0.5 hours or more as described above, then cooled at a rate of 15° C./h or more in a temperature range of 400° C. or more and less than 500° C., then cooled to 200° C. or less, and faced as needed. Clad materials obtained by joining the sheath materials to both the surfaces of the core materials to make the joined materials were subjected to second-stage heat treatment at 400° C. or more for 20 hours or less. The alloys Nos. B40 to B43, B54, B55, and B65 were not subjected to the homogenization treatment. For the alloys Nos. B36 to 39, B57, B59 to 61, and BC3, the clad materials obtained by joining the sheath materials to both the surfaces of the core materials to make the joined material were subjected to the homogenization treatment by performing the above-mentioned heat treatment only once.

TABLE 16

| | Core Material | | | | | | Sheath Material | |
|---|---|---|---|---|---|---|---|---|
| | | Casting Conditions | | Ingot Sheet Thickness (mm) | Conditions of Homogenization Treatment | | | Casting Conditions |
| | Alloy No. | Casting Method | Casting Velocity (mm/min) | | First-Stage Heating Temperature (° C.) | First-Stage Retention Time (hr) | Cooling Rate in Temperature Range of 400° C. or More and Less Than 500° C. (° C./hr) | Alloy No. | Casting Method |
| Example 66 | B1 | DC | 30 | 300 | 630 | 0.5 | 15.2 | C1 | DC |
| Example 67 | B2 | DC | 30 | 300 | 620 | 1 | 15.4 | C2 | DC |
| Example 68 | B3 | DC | 30 | 300 | 630 | 0.5 | 17.4 | C3 | DC |
| Example 69 | B4 | DC | 30 | 300 | 500 | 5 | 30.7 | C4 | DC |
| Example 70 | B5 | DC | 30 | 300 | 550 | 10 | 45.1 | C5 | DC |
| Example 71 | B6 | DC | 30 | 300 | 550 | 15 | 32.1 | C6 | DC |
| Example 72 | B7 | DC | 30 | 300 | 550 | 24 | 31.9 | C7 | DC |
| Example 73 | B8 | DC | 30 | 300 | 550 | 5 | 30.8 | CB | DC |
| Example 74 | B9 | DC | 30 | 300 | 550 | 5 | 30.7 | C9 | DC |
| Example 75 | B10 | DC | 30 | 300 | 550 | 5 | 30.1 | C10 | DC |
| Example 76 | B11 | DC | 40 | 300 | 550 | 5 | 30.9 | C11 | DC |
| Example 77 | B12 | DC | 40 | 300 | 550 | 5 | 34.2 | C12 | DC |
| Example 78 | B13 | DC | 40 | 300 | 550 | 5 | 32.1 | C13 | DC |
| Example 79 | B14 | DC | 40 | 300 | 550 | 5 | 31.1 | C14 | DC |
| Example 80 | B15 | DC | 20 | 300 | 550 | 5 | 32.1 | C15 | DC |
| Example 81 | B16 | DC | 20 | 300 | 550 | 5 | 31.7 | C16 | DC |
| Example 82 | B17 | DC | 20 | 300 | 550 | 5 | 31.5 | C17 | DC |
| Example 83 | B18 | DC | 40 | 300 | 550 | 5 | 31.4 | C18 | DC |
| Example 84 | B19 | DC | 50 | 300 | 550 | 5 | 29.8 | C19 | DC |
| Example 85 | B20 | DC | 40 | 300 | 550 | 5 | 28.9 | C20 | DC |
| Example 86 | B21 | DC | 50 | 300 | 550 | 5 | 30.7 | C21 | DC |
| Example 87 | B22 | DC | 50 | 300 | 550 | 5 | 30.1 | C22 | DC |
| Example 88 | B23 | DC | 50 | 300 | 550 | 5 | 30.9 | C23 | DC |
| Example 89 | B24 | DC | 50 | 300 | 550 | 5 | 29.9 | C24 | DC |
| Example 90 | B25 | DC | 50 | 300 | 550 | 5 | 29.5 | C25 | DC |
| Example 91 | B26 | DC | 50 | 300 | 550 | 5 | 30.5 | C26 | DC |
| Example 92 | B27 | CC | 1000 | 6 | 550 | 5 | 30.4 | C27 | DC |
| Example 93 | B28 | DC | 50 | 300 | 550 | 5 | 31.7 | C28 | DC |
| Example 94 | B29 | DC | 50 | 300 | 550 | 5 | 31.1 | C29 | DC |
| Example 95 | B30 | DC | 50 | 300 | 550 | 5 | 30.5 | C30 | DC |

| | Sheath Material | | Joined Material | | | | |
|---|---|---|---|---|---|---|---|
| | | | Conditions of Homogenization Treatment | | Conditions of Hot Rolling | | |
| | Casting Conditions Casting Velocity (mm/min) | Ingot Sheet Thickness (mm) | Second-Stage Heating Temperature (° C.) | Second-Stage Retention Time (hr) | Hot-Rolling Start Temperature (° C.) | Hot-Rolling End Temperature (° C.) | Time of Hot Rolling in Temperature Range of 390° C. or More and Less Than 500° C. (min) |
| Example 66 | 30 | 300 | 400 | 1 | 390 | 190 | 15 |
| Example 67 | 30 | 300 | 400 | 1 | 310 | 160 | — |
| Example 68 | 30 | 300 | 490 | 5 | 480 | 370 | 23 |
| Example 69 | 30 | 300 | 450 | 15 | 440 | 280 | 20 |
| Example 70 | 30 | 300 | 400 | 19 | 440 | 270 | 19 |

TABLE 16-continued

| | | | | | | | |
|---|---|---|---|---|---|---|---|
| Example 71 | 30 | 300 | 450 | 10 | 440 | 260 | 19 |
| Example 72 | 30 | 300 | 450 | 10 | 440 | 310 | 18 |
| Example 73 | 30 | 300 | 450 | 10 | 440 | 300 | 15 |
| Example 74 | 30 | 300 | 450 | 10 | 440 | 280 | 15 |
| Example 75 | 30 | 300 | 450 | 10 | 440 | 280 | 15 |
| Example 76 | 30 | 300 | 450 | 10 | 440 | 300 | 15 |
| Example 77 | 30 | 300 | 450 | 10 | 440 | 300 | 15 |
| Example 78 | 30 | 300 | 450 | 10 | 440 | 290 | 15 |
| Example 79 | 30 | 300 | 450 | 10 | 440 | 300 | 15 |
| Example 80 | 30 | 300 | 450 | 10 | 440 | 300 | 15 |
| Example 81 | 30 | 300 | 450 | 10 | 440 | 280 | 15 |
| Example 82 | 30 | 300 | 450 | 10 | 440 | 280 | 13 |
| Example 83 | 30 | 300 | 450 | 10 | 440 | 290 | 15 |
| Example 84 | 30 | 300 | 450 | 10 | 440 | 280 | 15 |
| Example 85 | 30 | 300 | 450 | 10 | 440 | 300 | 18 |
| Example 86 | 30 | 300 | 450 | 10 | 440 | 280 | 17 |
| Example 87 | 30 | 300 | 450 | 10 | 440 | 280 | 15 |
| Example 88 | 30 | 300 | 450 | 10 | 440 | 300 | 15 |
| Example 89 | 30 | 300 | 450 | 10 | 440 | 290 | 15 |
| Example 90 | 30 | 300 | 450 | 10 | 440 | 300 | 15 |
| Example 91 | 30 | 300 | 450 | 10 | 440 | 280 | 15 |
| Example 92 | 30 | 300 | 450 | 10 | 440 | 290 | 15 |
| Example 93 | 30 | 300 | 450 | 10 | 440 | 300 | 18 |
| Example 94 | 30 | 300 | 450 | 10 | 440 | 300 | 15 |
| Example 95 | 30 | 300 | 450 | 10 | 440 | 290 | 18 |

TABLE 17

| | Core Material | | | | | | Sheath Material | |
|---|---|---|---|---|---|---|---|---|
| | | Casting Conditions | | | Conditions of Homogenization Treatment | | | Casting Conditions |
| | Alloy No. | Casting Method | Casting Velocity (mm/min) | Ingot Sheet Thickness (mm) | First-Stage Heating Temperature (° C.) | First-Stage Retention Time (hr) | Cooling Rate in Temperature Range of 400° C. or More and Less Than 500° C. (° C./hr) | Alloy No. | Casting Method |
| Example 96 | B31 | DC | 50 | 300 | 550 | 5 | 31.1 | C31 | DC |
| Example 97 | B32 | CC | 1400 | 6 | 550 | 5 | 30.4 | C32 | DC |
| Example 98 | B33 | CC | 1000 | 6 | 550 | 5 | 30.5 | C33 | DC |
| Example 99 | B34 | CC | 800 | 6 | 550 | 5 | 31.7 | C34 | DC |
| Example 100 | B35 | DC | 60 | 300 | 550 | 5 | 31.1 | C35 | DC |
| Example 101 | B36 | DC | 60 | 300 | — | — | — | C36 | DC |
| Example 102 | B37 | DC | 50 | 300 | — | — | — | C37 | DC |
| Example 103 | B38 | DC | 50 | 300 | — | — | — | C38 | DC |
| Example 104 | B39 | DC | 50 | 300 | — | — | — | C39 | DC |
| Example 105 | B40 | DC | 50 | 300 | — | — | — | C40 | DC |
| Example 106 | B41 | DC | 50 | 300 | — | — | — | C41 | DC |
| Example 107 | B42 | DC | 50 | 300 | — | — | — | C42 | DC |
| Example 108 | B43 | DC | 50 | 300 | — | — | — | C43 | DC |
| Example 109 | B44 | DC | 50 | 300 | 450 | 5 | 30.4 | C44 | DC |
| Example 110 | B45 | DC | 50 | 300 | 470 | 5 | 30.6 | C45 | DC |
| Example 111 | B46 | DC | 50 | 300 | 510 | 0.1 | 31.7 | C46 | DC |
| Example 112 | B47 | DC | 50 | 300 | 510 | 0.2 | 30.8 | C47 | DC |
| Example 113 | B48 | DC | 50 | 300 | 550 | 5 | 9.1 | C48 | DC |
| Example 114 | B49 | DC | 50 | 300 | 550 | 5 | 8.8 | C49 | DC |
| Example 115 | B50 | DC | 50 | 300 | 550 | 5 | 30.5 | C50 | DC |
| Example 116 | B51 | DC | 50 | 300 | 550 | 5 | 30.2 | C51 | DC |
| Example 117 | B52 | DC | 50 | 300 | 550 | 5 | 31.7 | C52 | DC |
| Example 118 | B53 | DC | 50 | 300 | 550 | 5 | 31.7 | C53 | DC |
| Example 119 | B54 | DC | 50 | 300 | — | — | — | C54 | DC |
| Example 120 | B55 | DC | 50 | 300 | — | — | — | C55 | DC |
| Example 121 | B56 | DC | 50 | 300 | 550 | 5 | 30.5 | C56 | DC |
| Example 122 | B57 | DC | 50 | 300 | — | — | — | C57 | DC |
| Example 123 | B58 | DC | 50 | 300 | 550 | 5 | 30.8 | C58 | DC |
| Example 124 | B59 | DC | 50 | 300 | — | — | — | C59 | DC |
| Example 125 | B60 | DC | 50 | 300 | — | — | — | C60 | DC |
| Example 126 | B61 | DC | 50 | 300 | — | — | — | C61 | DC |
| Example 127 | B62 | DC | 50 | 300 | 550 | 5 | 31.1 | C62 | DC |
| Example 128 | B63 | DC | 50 | 300 | 550 | 5 | 31.1 | C63 | DC |

TABLE 17-continued

| | | | | | | | | | |
|---|---|---|---|---|---|---|---|---|---|
| Example 129 | B64 | DC | 50 | 300 | 550 | 5 | 31.1 | C64 | DC |
| Example 130 | B65 | CC | 800 | 6 | — | — | — | C65 | DC |

| | Joined Material | | | | | |
|---|---|---|---|---|---|---|
| | Sheath Material | | Conditions of Homogenization Treatment | | Conditions of Hot Rolling | | |
| | Casting Conditions Casting Velocity (mm/min) | Ingot Sheet Thickness (mm) | Second-Stage Heating Temperature (° C.) | Second-Stage Retention Time (hr) | Hot-Rolling Start Temperature (° C.) | Hot-Rolling End Temperature (° C.) | Time of Hot Rolling in Temperature Range of 390° C. or More and Less Than 500° C. (min) |
| Example 96 | 30 | 300 | 450 | 10 | 440 | 280 | 15 |
| Example 97 | 30 | 300 | 450 | 10 | 440 | 290 | 15 |
| Example 98 | 30 | 300 | 450 | 10 | 440 | 300 | 15 |
| Example 99 | 30 | 300 | 450 | 10 | 440 | 280 | 15 |
| Example 100 | 30 | 300 | 450 | 10 | 440 | 280 | 17 |
| Example 101 | 30 | 300 | 600 | 5 | 540 | 290 | 15 |
| Example 102 | 30 | 300 | 600 | 5 | 530 | 300 | 15 |
| Example 103 | 30 | 300 | 510 | 5 | 500 | 290 | 15 |
| Example 104 | 30 | 300 | 510 | 5 | 400 | 300 | 15 |
| Example 105 | 30 | 300 | — | — | 370 | 240 | — |
| Example 106 | 30 | 300 | — | — | 340 | 230 | — |
| Example 107 | 30 | 300 | — | — | 300 | 200 | — |
| Example 108 | 30 | 300 | — | — | 280 | 120 | — |
| Example 109 | 30 | 300 | 450 | 10 | 440 | 290 | 15 |
| Example 110 | 30 | 300 | 450 | 10 | 440 | 290 | 15 |
| Example 111 | 30 | 300 | 450 | 10 | 440 | 300 | 15 |
| Example 112 | 30 | 300 | 450 | 10 | 440 | 300 | 18 |
| Example 113 | 30 | 300 | 450 | 10 | 440 | 290 | 15 |
| Example 114 | 30 | 300 | 450 | 10 | 440 | 290 | 15 |
| Example 115 | 30 | 300 | 350 | 10 | 340 | 290 | — |
| Example 116 | 30 | 300 | 370 | 10 | 360 | 290 | — |
| Example 117 | 30 | 300 | 450 | 22 | 440 | 290 | 15 |
| Example 118 | 30 | 300 | 450 | 24 | 440 | 290 | 15 |
| Example 119 | 30 | 300 | — | — | 430 | 230 | 15 |
| Example 120 | 30 | 300 | — | — | 450 | 240 | 15 |
| Example 121 | 30 | 300 | 450 | 10 | 440 | 400 | 15 |
| Example 122 | 30 | 300 | 510 | 5 | 500 | 430 | 15 |
| Example 123 | 30 | 300 | 450 | 10 | 440 | 300 | 38 |
| Example 124 | 30 | 300 | 510 | 5 | 500 | 300 | 45 |
| Example 125 | 30 | 300 | 470 | 5 | 420 | 310 | 15 |
| Example 126 | 30 | 300 | 510 | 0.2 | 400 | 300 | 15 |
| Example 127 | 30 | 300 | 450 | 10 | 440 | 280 | 15 |
| Example 128 | 30 | 300 | 450 | 10 | 440 | 280 | 15 |
| Example 129 | 30 | 300 | 450 | 10 | 440 | 280 | 15 |
| Example 130 | 30 | 300 | — | — | 370 | 240 | — |

TABLE 18

| | Core Material | | | | | | | Sheath Material | |
|---|---|---|---|---|---|---|---|---|---|
| | | Casting Conditions | | Ingot Sheet Thickness (mm) | Conditions of Homogenization Treatment | | | | Casting Conditions |
| | Alloy No. | Casting Method | Casting Velocity (mm/min) | | First-Stage Heating Temperature (° C.) | First-Stage Retention Time (hr) | Cooling Rate in Temperature Range of 400° C. or More and Less Than 500° C. (° C./hr) | Alloy No. | Casting Method |
| Comparative Example 14 | BC1 | DC | 30 | 300 | 550 | 5 | 30.1 | CC1 | DC |
| Comparative Example 15 | BC2 | CC | 600 | 6 | 550 | 5 | 30.2 | CC2 | DC |
| Comparative Example 16 | BC3 | DC | 30 | 300 | — | — | — | CC3 | DC |
| Comparative Example 17 | BC4 | DC | 30 | 300 | 550 | 5 | 30.6 | CC4 | DC |

TABLE 18-continued

| | | | | | | | | |
|---|---|---|---|---|---|---|---|---|
| Comparative Example 18 | BC5 | DC | 30 | 300 | 550 | 5 | 29.8 | CC5 | DC |
| Comparative Example 19 | BC6 | DC | 30 | 300 | 550 | 5 | 30.1 | CC6 | DC |
| Comparative Example 20 | BC7 | DC | 30 | 300 | 550 | 5 | 30.3 | CC7 | DC |
| Comparative Example 21 | BC8 | DC | 30 | 300 | 550 | 5 | 30.1 | CC8 | DC |
| Comparative Example 22 | BC9 | DC | 30 | 300 | 550 | 5 | 30.5 | CC9 | DC |
| Comparative Example 23 | BC10 | DC | 30 | 300 | 550 | 5 | 30.1 | CC10 | DC |
| Comparative Example 24 | BC11 | DC | 30 | 300 | 550 | 5 | 30.1 | CC11 | DC |
| Comparative Example 25 | BC12 | DC | 30 | 300 | 550 | 5 | 30.6 | CC12 | DC |
| Comparative Example 26 | BC13 | DC | 30 | 300 | 550 | 5 | 30.2 | CC13 | DC |

| | Joined Material | | | | | | |
|---|---|---|---|---|---|---|---|
| | Sheath Material | | Conditions of Homogenization Treatment | | Conditions of Hot Rolling | | |
| | Casting Conditions Casting Velocity (mm/min) | Ingot Sheet Thickness (mm) | Second-Stage Heating Temperature (° C.) | Second-Stage Retention Time (hr) | Hot-Rolling Start Temperature (° C.) | Hot-Rolling End Temperature (° C.) | Time of Hot Rolling in Temperature Range of 390° C. or More and Less Than 500° C. (min) |
| Comparative Example 14 | 30 | 300 | 450 | 10 | 440 | 280 | 15 |
| Comparative Example 15 | 30 | 300 | 450 | 10 | 440 | 280 | 15 |
| Comparative Example 16 | 30 | 300 | 550 | 5 | 440 | 280 | 15 |
| Comparative Example 17 | 30 | 300 | 450 | 10 | 440 | 280 | 15 |
| Comparative Example 18 | 30 | 300 | 450 | 10 | 440 | 280 | 15 |
| Comparative Example 19 | 30 | 300 | 450 | 10 | 440 | 280 | 15 |
| Comparative Example 20 | 30 | 300 | 450 | 10 | 440 | 280 | 15 |
| Comparative Example 21 | 30 | 300 | 450 | 10 | 440 | 280 | 15 |
| Comparative Example 22 | 30 | 300 | 450 | 10 | 440 | 280 | 15 |
| Comparative Example 23 | 30 | 300 | 450 | 10 | 440 | 280 | 15 |
| Comparative Example 24 | 30 | 300 | 450 | 10 | 440 | 280 | 15 |
| Comparative Example 25 | 30 | 300 | 450 | 10 | 440 | 280 | 15 |
| Comparative Example 26 | 30 | 300 | 450 | 10 | 440 | 280 | 15 |

Moreover, both surfaces of each of the ingots of the alloys Nos. B1 to B26, B28 to B31, B35, B44 to B53, B56, B58, B62 to B64, BC1, and BC4 to BC13, among the alloys subjected to the second-stage homogenization treatment in the state of a clad material, were faced in 15 mm before the second-stage homogenization treatment. The alloys Nos. B27, B32 to B34, B65, and BC2 were made into core materials without being faced, and sheath materials were joined to both surfaces of the core materials to make joined materials. In the case of performing the second-stage homogenization treatment, a temperature-raising rate to a heating temperature was set at 40° C./h. Then, hot rolling was performed under the conditions set forth in Tables 16 to 18 to make a hot-rolled sheet having a sheet thickness of 2.0 mm (step S204). In the case of performing the homogenization treatment, a temperature decrease rate from a final heating temperature to a hot-rolling start temperature was set at 30° C./h. After the hot rolling, the hot-rolled sheets of the alloys Nos. B1, B3, B5, and BC1 were subjected to annealing (batch type) under conditions of 360° C. and 2 hours. All the sheet materials were rolled to have a final sheet thickness of 0.8 mm by cold rolling (rolling reduction of 60.0%), to make aluminum alloy substrates (step S205). Disk blanks were stamped and produced to have an annular shape with an outer diameter of 96 mm and an inner diameter of 24 mm from the aluminum alloy sheets (step S206).

Each of the disk blanks produced in such a manner was subjected to pressurization annealing at 300° C. for 3 hours, and was flattened (step S207). The disk blank was subjected to end-surface preparation to have an outer diameter of 95 mm and an inner diameter of 25 mm and subjected to grinding work (grinding of surface of 10 μm) (step S208). Then, the disk blank was degreased at 60° C. for 5 minutes by AD-68F (trade name, manufactured by C. Uyemura & Co., Ltd.), etched at 65° C. for 1 minute by AD-107F (trade name, manufactured by C. Uyemura & Co., Ltd.), and further subjected to desmutting treatment with 30% $HNO_3$ aqueous solution (room temperature) for 20 seconds.

The disk blank of which a surface state had been prepared in such a manner was immersed in a zincate treatment liquid, at 20° C., of AD-301F-3X (trade name, manufactured by C. Uyemura & Co., Ltd.) for 0.5 minute to perform zincate treatment of the surface (step S209). The zincate treatment was performed twice in total, and the disk blank was immersed in 30% $HNO_3$ aqueous solution at room temperature for 20 seconds between such zincate treatments to subject the surface to peeling treatment. The surface subjected to the zincate treatment was subjected to double zincate treatment using AD-301F-3X (trade name, manufactured by C. Uyemura & Co., Ltd.) (step S209). The surface subjected to the zincate treatment was electroless plated with Ni—P of 17 μm in thickness using an electroless Ni—P plating treatment liquid (NIMUDEN HDX (trade name, manufactured by C. Uyemura & Co., Ltd.)) and then subjected to final polishing (polishing quantity of 4 μm) by a fabric (step S210).

The aluminum alloy ingot after the casting (step S202-1) step, the aluminum alloy sheet after the cold rolling (step S205), the aluminum alloy substrate after the grinding work (step S208) step, and the aluminum alloy substrate after the plating treatment polishing (step S210) step were subjected to the following evaluations. Plating treatment of two disks was performed in each sample. In the disks of Comparative Examples 17 to 26, however, plating peeling occurred, and therefore, it was impossible to measure disk flutter. Plating peeling occurred in one of the two disks in Examples 66, and 127 to 129, but the evaluations were performed using the disk in which the plating peeling had not occurred.

[Cooling Rate in Casting of Core Material]

The dendrite arm spacing (DAS) of the ingot after the casting (step S202-1) was measured to calculate a cooling rate (° C./s) in the casting. A cross-sectional structure in an ingot thickness direction was observed with an optical microscope, and the DAS was measured by a secondary arm method. The cross section of the center in the thickness direction of the ingot was used for the measurement.

[Proof Stress]

Proof stress was measured in conformity with JIS Z2241 by performing annealing (pressurization annealing simulated heating), at 300° C. for 3 hours, of the aluminum alloy sheet subjected to the cold rolling (step S205), heating the aluminum alloy sheet in atmospheric air at 300° C. for 3 hours, sampling JIS No. 5 test pieces along the rolling direction, and setting n=2. In the evaluation of the strength, a proof stress of 45 MPa or more was evaluated as A (excellent), a proof stress of 35 MPa or more and less than 45 MPa was evaluated as B (good), a proof stress of 30 MPa or more and less than 35 MPa was evaluated as C (fair), and a proof stress of less than 30 MPa was evaluated as D (poor). The plating of the aluminum alloy substrate and the magnetic disk after the grinding work was peeled to sample a test piece from the substrate of which the surface of 10 μm was ground. It is also possible to evaluate proof stress by heating the test piece in atmospheric air at 300° C. for 3 hours. As the dimensions of the test piece in such a case, the width of a parallel portion is set at 5±0.14 mm, the original gage length of the test piece is set at 10 mm, the radius of the shoulder is set at 2.5 mm, and the length of the parallel portion is set at 15 mm.

[Amount of Solid Solution of Fe in Core Material]

The amount of the solid solution of Fe in the core material was measured by the following procedure using the aluminum alloy substrate subjected to the grinding work (step S108). After removal of the portions of the sheath materials by polishing or the like, the total amount of precipitated Fe in the aluminum alloy substrate was analyzed and measured from a residue obtained by a heat phenol dissolution extraction method, and a value obtained by subtracting the total amount from the value measured by analyzing an Fe component was regarded as the amount of the solid solution of Fe. A method for analyzing the amount of precipitated Fe was performed with reference to academic literatures in "Sato, Izumi: Abstracts of the 68th Spring Conference of the Japan Institute of Light Metals, (1985) 55." and academic literatures in "Muramatsu, Matsuo, Komatsu, and others: Abstracts of the 76th Spring Conference of the Japan Institute of Light Metals, (1989), 51.".

The heat phenol dissolution extraction method will be described. From the aluminum alloy substrate from which the sheath materials had been removed, 2 g of a test piece was sampled. For the test piece, a small piece was cut from the aluminum alloy substrate and weighed to have a total of 2 g. Then, a beaker in which 50 mL of phenol was put was placed on a hot plate, and phenol was heated to 170 to 180° C., followed by putting and dissolving the test piece in the phenol. Then, the beaker in which such a solution was put was transferred from a location on the hot plate, and was cooled. Then, benzyl alcohol was added to the cooled solution in order to prevent solidification. Then, the solution to the benzyl alcohol had been added was filtered through a membrane filter (pore diameter of 0.1 μm) made of polytetrafluoroethylene, to obtain an Al—Fe-based intermetallic compound as a residue. Then, Si in the residue obtained by the heat phenol dissolution extraction method was dissolved in a 10%-NaOH solution, and Fe was dissolved in a liquid mixture obtained by adding aqua regia (at a volume ratio between concentrated hydrochloric acid and concentrated nitric acid, of 3:1) to such a solution. In such a manner, the liquid mixture containing dissolved Si and Fe was obtained. Then, the liquid mixture was quantified and analyzed by an inductive coupling plasma emission analysis method (ICP). As a result, the amount of Fe precipitated as an Al—Fe-based intermetallic compound was determined.

Then, the amount of precipitated Fe obtained by the heat phenol dissolution extraction method was regarded as the total amount of precipitated Fe. A value obtained by subtracting the amount of the total amount of precipitated Fe from the value measured by analyzing an Fe component in the aluminum alloy substrate was regarded as the amount of the solid solution of Fe in the core material.

[Longest Diameter and Boundary Length of Second Phase Particles in Core Material]

A cross section of the aluminum alloy substrate subjected to the grinding work (step S208) was polished, followed by observing 1 $mm^2$ with an optical microscope at 400 times to measure the longest diameter and boundary length (mm/$mm^2$) of the second phase particles in core material by using particle analysis software A-ZO-KUN (trade name, manufactured by Asahi Kasei Engineering Corporation). The cross section of the center in the thickness direction of the substrate was used for the measurement.

[Measurement of Disk Flutter]

Disk flutter was measured using the aluminum alloy substrate subjected to the plating treatment polishing (step S210) step. The disk flutter was measured by placing the aluminum alloy substrate on a commercially available hard disk drive in the presence of air. ST2000 (trade name) manufactured by Seagate was used as the drive, and a motor to which SLD102 (trade name) manufactured by Techno Alive Co. was directly connected was driven. Plural disks at a rotation number set at 7200 rpm were always placed, and the vibrations of a surface of the top magnetic disk of the disks were observed with LDV1800 (trade name), as a laser Doppler meter, manufactured by ONO SOKKI CO., LTD. The observed vibrations were subjected to spectrum analysis with an FFT analysis apparatus DS3200 (trade name) manufactured by ONO SOKKI CO., LTD. The observation was performed by observing the disk surface through a hole opened in the lid of the hard disk drive. In addition, a squeeze plate placed in the commercially available hard disk was removed, and the evaluation was performed.

A fluttering characteristic was evaluated with the maximum displacement (disk fluttering (nm)) of a broad peak in the vicinity of 300 to 1500 Hz at which fluttering appears. Such a broad peak, referred to as non-repeatable run out (NRRO), has been found to greatly influence the positioning error of a head. In air, a fluttering characteristic of 30 nm or less was evaluated as A (excellent), a fluttering characteristic of more than 30 nm and 40 nm or less was evaluated as B (good), a fluttering characteristic of more than 40 nm and 50 nm or less was evaluated as C (fair), and a fluttering characteristic of more than 50 nm was evaluated as D (poor).

The above evaluation results are set forth in Tables 19 to 21.

TABLE 19

| | Alloy No. of Core Material | Alloy No. of Sheath Material | Cooling Rate in Casting of Core Material (° C./s) | Boundary Length of Second Phase Particles Having Longest Diameter of 3 μm Or More in Core Material (mm/mm$^2$) | Amount of Solid Solution of Fe in Core Material (mass %) | Strength Proof Stress (MPa) | Evaluation | Fluttering Characteristic |
|---|---|---|---|---|---|---|---|---|
| Example 66 | B1 | C1 | 0.5 | 24 | 0.0018 | 32 | C | B |
| Example 67 | B2 | C2 | 0.4 | 39 | 0.0030 | 45 | A | A |
| Example 68 | B3 | C3 | 0.6 | 86 | 0.0043 | 52 | A | A |
| Example 69 | B4 | C4 | 0.7 | 92 | 0.0037 | 56 | A | A |
| Example 70 | B5 | C5 | 0.5 | 103 | 0.0038 | 54 | A | A |
| Example 71 | B6 | C6 | 0.7 | 131 | 0.0040 | 58 | A | A |
| Example 72 | B7 | C7 | 0.3 | 141 | 0.0043 | 68 | A | A |
| Example 73 | B8 | C8 | 0.6 | 183 | 0.0041 | 74 | A | A |
| Example 74 | B9 | C9 | 0.4 | 236 | 0.0037 | 84 | A | A |
| Example 75 | B10 | C10 | 0.5 | 784 | 0.0045 | 89 | A | A |
| Example 76 | B11 | C11 | 0.8 | 169 | 0.0035 | 79 | A | A |
| Example 77 | B12 | C12 | 0.8 | 168 | 0.0044 | 89 | A | A |
| Example 78 | B13 | C13 | 0.9 | 151 | 0.0045 | 93 | A | A |
| Example 79 | B14 | C14 | 0.8 | 155 | 0.0037 | 95 | A | A |
| Example 80 | B15 | C15 | 0.2 | 143 | 0.0040 | 97 | A | A |
| Example 81 | B16 | C16 | 0.2 | 138 | 0.0040 | 79 | A | A |
| Example 82 | B17 | C17 | 0.2 | 129 | 0.0040 | 79 | A | A |
| Example 83 | B18 | C18 | 0.8 | 137 | 0.0040 | 78 | A | A |
| Example 84 | B19 | C19 | 0.8 | 167 | 0.0042 | 91 | A | A |
| Example 85 | B20 | C20 | 0.9 | 179 | 0.0043 | 95 | A | A |
| Example 86 | B21 | C21 | 1.0 | 169 | 0.0042 | 83 | A | A |
| Example 87 | B22 | C22 | 0.8 | 147 | 0.0039 | 79 | A | A |
| Example 88 | B23 | C23 | 1.2 | 148 | 0.0041 | 89 | A | A |
| Example 89 | B24 | C24 | 0.8 | 139 | 0.0040 | 98 | A | A |
| Example 90 | B25 | C25 | 0.9 | 159 | 0.0041 | 74 | A | A |
| Example 91 | B26 | C26 | 0.8 | 158 | 0.0037 | 92 | A | A |
| Example 92 | B27 | C27 | 554.0 | 14 | 0.0045 | 128 | A | C |
| Example 93 | B28 | C28 | 0.8 | 158 | 0.0040 | 62 | A | A |
| Example 94 | B29 | C29 | 0.9 | 145 | 0.0039 | 75 | A | A |
| Example 95 | B30 | C30 | 0.8 | 159 | 0.0040 | 85 | A | A |

TABLE 20

| | Alloy No. of Core Material | Alloy No. of Sheath Material | Cooling Rate in Casting of Core Material (° C./s) | Boundary Length of Second Phase Particles Having Longest Diameter of 3 μm Or More in Core Material (mm/mm$^2$) | Amount of Solid Solution of Fe in Core Material (mass %) | Strength Proof Stress (MPa) | Evaluation | Fluttering Characteristic |
|---|---|---|---|---|---|---|---|---|
| Example 96 | B31 | C31 | 0.8 | 195 | 0.0038 | 92 | A | A |
| Example 97 | B32 | C32 | 253.0 | 146 | 0.0043 | 138 | A | A |
| Example 98 | B33 | C33 | 831.0 | 106 | 0.0038 | 161 | A | A |

TABLE 20-continued

| | Alloy No. of Core Material | Alloy No. of Sheath Material | Cooling Rate in Casting of Core Material (° C./s) | Boundary Length of Second Phase Particles Having Longest Diameter of 3 μm Or More in Core Material (mm/mm$^2$) | Amount of Solid Solution of Fe in Core Material (mass %) | Strength Proof Stress (MPa) | Evaluation | Fluttering Characteristic |
|---|---|---|---|---|---|---|---|---|
| Example 99 | B34 | C34 | 954.3 | 142 | 0.0038 | 92 | A | A |
| Example 100 | B35 | C35 | 1.1 | 140 | 0.0038 | 72 | A | A |
| Example 101 | B36 | C36 | 1.2 | 120 | 0.0043 | 77 | A | A |
| Example 102 | B37 | C37 | 0.8 | 68 | 0.0046 | 49 | A | A |
| Example 103 | B38 | C38 | 0.9 | 190 | 0.0042 | 74 | A | A |
| Example 104 | B39 | C39 | 0.8 | 236 | 0.0046 | 89 | A | A |
| Example 105 | B40 | C40 | 0.8 | 49 | 0.0021 | 41 | B | A |
| Example 106 | B41 | C41 | 0.9 | 114 | 0.0068 | 66 | A | A |
| Example 107 | B42 | C42 | 0.8 | 106 | 0.0131 | 68 | A | A |
| Example 108 | B43 | C43 | 0.9 | 101 | 0.0358 | 67 | A | A |
| Example 109 | B44 | C44 | 0.9 | 80 | 0.0008 | 32 | C | A |
| Example 110 | B45 | C45 | 0.9 | 84 | 0.0007 | 31 | C | A |
| Example 111 | B46 | C46 | 0.8 | 83 | 0.0007 | 33 | C | A |
| Example 112 | B47 | C47 | 0.8 | 77 | 0.0008 | 32 | C | A |
| Example 113 | B48 | C48 | 0.04 | 49 | 0.0008 | 32 | C | A |
| Example 114 | B49 | C49 | 0.8 | 70 | 0.0007 | 30 | C | A |
| Example 115 | B50 | C50 | 0.9 | 14 | 0.0043 | 48 | A | C |
| Example 116 | B51 | C51 | 0.8 | 11 | 0.0039 | 49 | A | C |
| Example 117 | B52 | C52 | 0.8 | 75 | 0.0009 | 32 | C | A |
| Example 118 | B53 | C53 | 0.9 | 73 | 0.0008 | 31 | C | A |
| Example 119 | B54 | C54 | 0.9 | 66 | 0.0009 | 32 | C | A |
| Example 120 | B55 | C55 | 0.8 | 70 | 0.0008 | 31 | C | A |
| Example 121 | B56 | C56 | 0.9 | 55 | 0.0007 | 32 | C | A |
| Example 122 | B57 | C57 | 0.8 | 70 | 0.0009 | 33 | C | A |
| Example 123 | B58 | C58 | 0.8 | 47 | 0.0008 | 33 | C | A |
| Example 124 | B59 | C59 | 0.8 | 71 | 0.0008 | 33 | C | A |
| Example 125 | B60 | C60 | 0.9 | 51 | 0.0007 | 33 | C | A |
| Example 126 | B61 | C61 | 0.8 | 70 | 0.0009 | 32 | C | A |
| Example 127 | B62 | C62 | 0.6 | 62 | 0.0042 | 47 | A | A |
| Example 128 | B63 | C63 | 0.7 | 109 | 0.0043 | 59 | A | A |
| Example 129 | B64 | C64 | 0.5 | 731 | 0.0042 | 82 | A | A |
| Example 130 | B65 | C65 | 971.0 | 65 | 0.0421 | 80 | A | C |

TABLE 21

| | Alloy No. of Core Material | Alloy No. of Sheath Material | Cooling Rate in Casting of Core Material (° C./s) | Boundary Length of Second Phase Particles Having Longest Diameter of 3μm Or More in Core Material (mm/mm$^2$) | Amount of Solid Solution of Fe in Core Material (mass %) | Strength Proof Stress (MPa) | Evaluation | Fluttering Characteristic |
|---|---|---|---|---|---|---|---|---|
| Comparative Example 14 | BC1 | CC1 | 0.4 | 4 | 0.0027 | 27 | D | D |
| Comparative Example 15 | BC2 | CC2 | 1032.0 | 3 | 0.0026 | 27 | D | D |
| Comparative Example 16 | BC3 | CC3 | 0.5 | 8 | 0.0025 | 28 | D | D |
| Comparative Example 17 | BC4 | CC4 | 0.5 | 852 | 0.0039 | 103 | A | — |
| Comparative Example 18 | BC5 | CC5 | 0.3 | 869 | 0.0035 | 106 | A | — |
| Comparative Example 19 | BC6 | CC6 | 0.4 | 923 | 0.0040 | 102 | A | — |
| Comparative Example 20 | BC7 | CC7 | 0.5 | 997 | 0.0035 | 89 | A | — |
| Comparative Example 21 | BC8 | CC8 | 0.5 | 938 | 0.0042 | 92 | A | — |
| Comparative Example 22 | BC9 | CC9 | 0.3 | 926 | 0.0043 | 95 | A | — |
| Comparative Example 23 | BC10 | CC10 | 0.4 | 858 | 0.0038 | 131 | A | — |
| Comparative Example 24 | BC11 | CC11 | 0.5 | 878 | 0.0035 | 98 | A | — |

TABLE 21-continued

| | Alloy No. of Core Material | Alloy No. of Sheath Material | Cooling Rate in Casting of Core Material (° C./s) | Boundary Length of Second Phase Particles Having Longest Diameter of 3μm Or More in Core Material (mm/mm²) | Amount of Solid Solution of Fe in Core Material (mass %) | Strength Proof Stress (MPa) | Evaluation | Fluttering Characteristic |
|---|---|---|---|---|---|---|---|---|
| Comparative Example 25 | BC12 | CC12 | 0.4 | 869 | 0.0045 | 132 | A | — |
| Comparative Example 26 | BC13 | CC13 | 0.5 | 236 | 0.0048 | 83 | A | — |

As set forth in Tables 19 to 21, Examples 66 to 130 were able to result in favorable strength and fluttering characteristic.

In contrast, Comparative Examples 14 to 16 resulted in poor strength and poor fluttering characteristic due to the too small content of Fe in an aluminum alloy.

Comparative Examples 17 and 18 resulted in occurrence of plating peeling in such a manner as described above due to the too large content of Fe in an aluminum alloy, and were inappropriate for a magnetic disk.

Comparative Example 19 resulted in occurrence of plating peeling in such a manner as described above due to the too large content of Mn in an aluminum alloy, and was inappropriate for a magnetic disk.

Comparative Example 20 resulted in occurrence of plating peeling in such a manner as described above due to the too large content of Si in an aluminum alloy, and was inappropriate for a magnetic disk.

Comparative Example 21 resulted in occurrence of plating peeling in such a manner as described above due to the too large content of Ni in an aluminum alloy, and was inappropriate for a magnetic disk.

Comparative Example 22 resulted in occurrence of plating peeling in such a manner as described above due to the too large content of Cu in an aluminum alloy, and was inappropriate for a magnetic disk.

Comparative Example 23 resulted in occurrence of plating peeling in such a manner as described above due to the too large content of Mg in an aluminum alloy, and was inappropriate for a magnetic disk.

Comparative Example 24 resulted in occurrence of plating peeling in such a manner as described above due to the too large content of Cr in an aluminum alloy, and was inappropriate for a magnetic disk.

Comparative Example 25 resulted in occurrence of plating peeling in such a manner as described above due to the too large content of Zr in an aluminum alloy, and was inappropriate for a magnetic disk. Comparative Example 26 resulted in occurrence of plating peeling in such a manner as described above due to the too large content of Zn in an aluminum alloy, and was inappropriate for a magnetic disk.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

In accordance with the present disclosure, there can be obtained an aluminum alloy substrate for a magnetic disk, having high strength and an excellent disk fluttering characteristic, a method for producing the aluminum alloy substrate for a magnetic disk, and a magnetic disk using the aluminum alloy substrate for a magnetic disk.

The invention claimed is:

1. An aluminum alloy substrate for a magnetic disk, comprising an aluminum alloy consisting of:
   0.4 to 3.0 mass % of Fe,
   0.1 to 6.0 mass % of Mg,
   greater than 0 to 0.4 mass % of Si,
   and optionally at least one selected from the group consisting of 0.1 to 3.0 mass % of Mn, 0.1 to 3.0 mass % of Ni, 0.005 to 1.000 mass % of Cu, 0.01 to 1.00 mass % of Cr, and 0.01 to 1.00 mass % of Zr, 0.005 to 1.000 mass % of Zn, and a total content of Ti, B, and V of 0.005 to 0.500 mass %,
   with a balance of Al and unavoidable impurities, wherein a boundary length of a second phase particle having a longest diameter of 3 μm or more is 10 mm/mm² or more in a metal structure.

2. The aluminum alloy substrate according to claim 1, wherein at least one of the Mn, Ni, Cu, Cr, and Zr is present in the aluminum alloy.

3. The aluminum alloy substrate according to claim 2, wherein the Zn is present in the aluminum alloy.

4. The aluminum alloy substrate according to claim 3, wherein at least one of the Ti, B, and V is present in the aluminum alloy.

5. The aluminum alloy substrate according to claim 2, wherein at least one of the Ti, B, and V is present in the aluminum alloy.

6. The aluminum alloy substrate according to claim 1, wherein the Zn is present in the aluminum alloy.

7. The aluminum alloy substrate according to claim 1, wherein at least one of the Ti, B, and V is present in the aluminum alloy.

8. The aluminum alloy substrate according to claim 1, wherein an amount of solid solution of Fe in the aluminum alloy substrate is 0.0010 mass % or more.

9. The aluminum alloy substrate according to claim 1, wherein a proof stress of the aluminum alloy substrate is 35 MPa or more after heating at 300° C. for 3 hours in atmospheric air.

10. The aluminum alloy substrate according to claim 1, wherein both surfaces of a core material using the aluminum alloy are clad with a sheath material comprising pure Al or an Al—Mg-based alloy.

11. A magnetic disk wherein an electroless Ni—P plating treatment layer and a magnetic layer formed thereon are disposed on a surface of the aluminum alloy substrate according to claim 1.

12. A method for producing the aluminum alloy substrate according to claim 1, the method comprising: a casting step of casting an ingot using an aluminum alloy; a hot-rolling step of hot-rolling the ingot; a cold-rolling step of cold-rolling the hot-rolled sheet; a disk blank stamping step of stamping the cold-rolled sheet to have an annular shape; a pressurization annealing step of subjecting the stamped disk blank to pressurization annealing; and a cutting/grinding step of performing cutting work and grinding work of the stamped disk blank subjected to the pressurization annealing.

13. The method according to claim 12, further comprising a homogenization heat treatment step of performing homogenization heat treatment of the ingot between the casting step and the hot-rolling step.

14. The method according to claim 12, further comprising an annealing treatment step of annealing the rolled sheet before or in the cold rolling.

15. A method for producing the aluminum alloy substrate according to claim 10, the method comprising: a core material casting step of casting an ingot for a core material using an aluminum alloy; a sheath material casting step of casting an ingot for a sheath material using pure Al or an Al—Mg-based alloy; a sheath material step of performing homogenization treatment of the ingot for a sheath material and then hot-rolling the ingot to make a sheath material; a joined material step of joining the sheath material to each of both surfaces of the ingot for a core material to make a joined material; a hot-rolling step of hot-rolling the joined material; a cold-rolling step of cold-rolling the hot-rolled sheet; a disk blank stamping step of stamping the cold-rolled sheet to have an annular shape; a pressurization annealing step of subjecting the stamped disk blank to pressurization annealing; and a cutting/grinding step of performing cutting work and grinding work of the stamped disk blank subjected to the pressurization annealing.

16. The method according to claim 15, further comprising a homogenization heat treatment step of performing homogenization heat treatment of the joined material between the joined material step and the hot-rolling step.

17. The method according to claim 15, further comprising an annealing treatment step of annealing the rolled sheet before or in the cold rolling.

\* \* \* \* \*